United States Patent
Sinchev et al.

(10) Patent No.: US 10,860,317 B2
(45) Date of Patent: *Dec. 8, 2020

(54) COMPUTING NETWORK ARCHITECTURE FOR REDUCING COMPUTING OPERATION TIME, MEMORY USAGE, OR OTHER COMPUTING RESOURCE USAGE, ASSOCIATED WITH DETERMINING, FROM A SET OF DATA ELEMENTS, AT LEAST TWO DATA ELEMENTS, ASSOCIATED WITH A TARGET COMPUTING OPERATION RESULT

(71) Applicants: Bakhtgerey Sinchev, Almaty (KZ); Askar Sinchev, Astana (KZ); Zhanna Akzhanova, Astana (KZ); Yerlan Issekeshev, Almaty (KZ)

(72) Inventors: Bakhtgerey Sinchev, Almaty (KZ); Askar Sinchev, Astana (KZ); Zhanna Akzhanova, Astana (KZ); Yerlan Issekeshev, Almaty (KZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,726

(22) Filed: Dec. 12, 2019

(65) Prior Publication Data

US 2020/0192876 A1    Jun. 18, 2020

Related U.S. Application Data

(63) Continuation of application No. PCT/IB2019/001297, filed on Dec. 10, 2019, which
(Continued)

(51) Int. Cl.
*G06F 9/30* (2018.01)
*G06F 16/953* (2019.01)
(Continued)

(52) U.S. Cl.
CPC .......... *G06F 9/3001* (2013.01); *G06F 9/3004* (2013.01); *G06F 9/5061* (2013.01);
(Continued)

(58) Field of Classification Search
None
See application file for complete search history.

(56) References Cited

U.S. PATENT DOCUMENTS 6,070,157 A * 5/2000 Jacobson .............. G06F 16/951
7,454,430 B1 * 11/2008 Komissarchik ....... G06F 16/345
(Continued)

FOREIGN PATENT DOCUMENTS

EP    3179387 A1    6/2017
WO   2006028953 A3   3/2006
(Continued)

OTHER PUBLICATIONS

Yuriy Lifshic, Lecture "Introduction to exponential algorithms", http://yury.name/modern/01modernnote.pdf, 2005, 6 pages.
(Continued)

*Primary Examiner* — Richard L Bowen
(74) *Attorney, Agent, or Firm* — Baker & McKenzie LLP

(57) ABSTRACT

This disclosure is directed to reducing a computing operation time and reducing memory usage associated with determining at least two target data elements, associated with a target computing operation result, from a set of data elements. This disclosure can be extended to determining more than two target data elements, associated with a target computing operation result, from a set of data elements, as well.

13 Claims, 3 Drawing Sheets

Related U.S. Application Data is a continuation-in-part of application No. 16/221,904, filed on Dec. 17, 2018, now Pat. No. 10,394,555.

(51) Int. Cl.

| | | |
|---|---|---|
| *G06F 16/901* | (2019.01) | |
| *G06F 9/50* | (2006.01) | |
| *G06F 16/2455* | (2019.01) | |
| *G06F 16/215* | (2019.01) | |

(52) U.S. Cl.
CPC ........ *G06F 16/215* (2019.01); *G06F 16/2455* (2019.01); *G06F 16/901* (2019.01); *G06F 16/953* (2019.01)

(56) References Cited

U.S. PATENT DOCUMENTS

| | | | | |
|---|---|---|---|---|
| 8,473,503 | B2* | 6/2013 | Cheng | G06F 7/00 707/755 |
| 8,799,624 | B1* | 8/2014 | Griffin | G06F 9/5022 712/29 |
| 9,183,286 | B2* | 11/2015 | Chen | G06F 16/353 |
| 9,384,264 | B1* | 7/2016 | Kavas | G06F 16/313 |
| 9,613,109 | B2* | 4/2017 | Wright | G06F 16/2308 |
| 9,615,555 | B2* | 4/2017 | Ikebukuro | A01K 89/015 |
| 9,922,066 | B2* | 3/2018 | Swan | G06F 16/2272 |
| 2004/0044662 | A1* | 3/2004 | Ganesan | G06F 16/24537 |
| 2004/0049503 | A1* | 3/2004 | Modha | G06K 9/6223 |
| 2006/0047636 | A1* | 3/2006 | Mohania | G06F 16/20 |
| 2006/0047646 | A1* | 3/2006 | Maluf | G06F 16/8358 |
| 2006/0074881 | A1* | 4/2006 | Vembu | G06F 16/25 |
| 2006/0173920 | A1* | 8/2006 | Adler | G06F 16/332 |
| 2006/0218123 | A1* | 9/2006 | Chowdhuri | G06F 16/24532 |
| 2008/0077570 | A1* | 3/2008 | Tang | G06F 16/3344 |
| 2009/0012923 | A1* | 1/2009 | Moses | G06Q 10/10 706/46 |
| 2012/0330944 | A1* | 12/2012 | Vailaya | G06F 16/148 707/723 |
| 2014/0365545 | A1* | 12/2014 | Moffitt | G06F 17/11 708/207 |
| 2016/0132572 | A1* | 5/2016 | Chang | G06F 16/258 707/723 |
| 2016/0283599 | A1* | 9/2016 | Zonabend | G06Q 10/087 |
| 2018/0349364 | A1* | 12/2018 | Arnold | G06F 16/21 |

FOREIGN PATENT DOCUMENTS

| | | |
|---|---|---|
| WO | 2007149623 A2 | 12/2007 |
| WO | 2009105708 A3 | 8/2009 |
| WO | 2015084757 A1 | 6/2015 |

OTHER PUBLICATIONS

Yuriy Lifshic, Lecture "Exact algorithms and open problems", http://yury.name/modern/02.pdf, Sep. 2005, 9 pages.

Adamanskiy, "Overview of text search methods and algorithms", Novosibirsk State University, http://grush-store.narod.ru, Sep. 23, 2011, 26 pages.

C.A.R. Hoare, "Quicksort", The Computer Journal, vol. 5, Issue 1, Jan. 1, 1962, https://doi.org/10.1093/comjnl/5.1.10, pp. 10-16.

Richard Schroeppel, et al., "Algorithm for Certain NP-Complete Problems", Laboratory for Computer Science, Massachusettes Institute of Technology, Cambridge, Massachusetts, Jan. 1980, 27 pages.

S.G. Akl, "Adaptive and Optimal Parallel Algorithms for Enumerating Permutations and Combinations", Department of Computing and Information Service, Queen's University, Kingston, Ontario, Canada, The Computer Journal, vol. 30, No. 5, 1987, pp. 433-436.

International Search Report and Written Opinion dated May 14, 2020 in connection with International Application No. PCT/IB2019/001297, 12 pages.

C. J. van Rijsbergen, "Information Retrieval" Dept. of Computer Science. University of Glasgow, 1979, 153 pages.

E. Horowitz, S. Sanni, Computing Partitions with Application to the Knapsack Problem // Journal of the ACM (JACM), 1974, T21, pp. 277-292.

Ervin Knuth, "The Art of Computer Programming", Third Edition, vol. 1, Fundamental Algorithims, May 1997, 664 pages.

Jeffrey J. McConnell, Analysis of Algorithms: An Active Learning Approach, Jonas and Bartlett Publishers, 2001, 315 pages.

Granino A. Korn et al., Mathematical Handbook for Scientists and Engineers, Dover Publications, 2000, 1151 pages.

Sinchev et al., Series of Geology and Technical Sciences, News of the Academy of Sciences of the Republic of Kazakhstan, May-Jun. 2019, 13 pages.

Sinchev et al., Series of Geology and Technical Sciences, News of the Academy of Sciences of the Republic of Kazakhstan, Sep.-Oct. 2018, 14 pages.

* cited by examiner

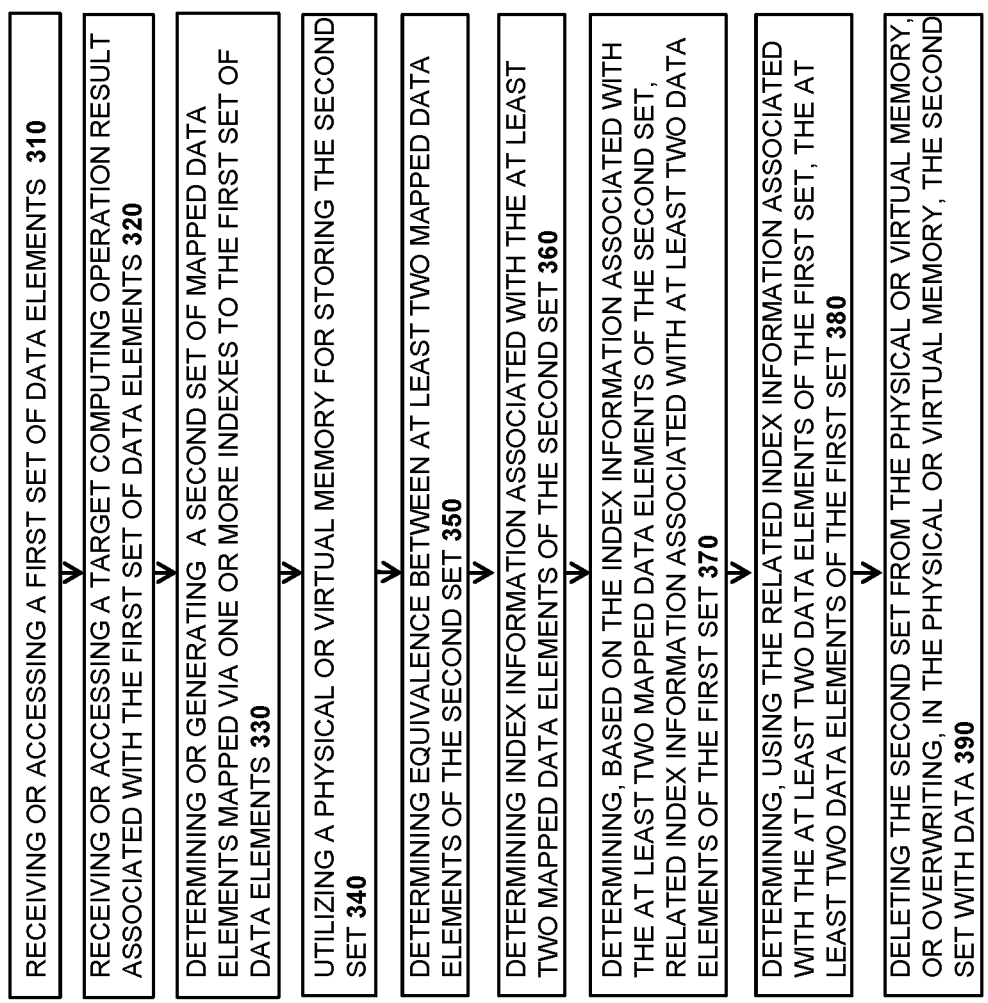

COMPUTING NETWORK ARCHITECTURE FOR REDUCING COMPUTING OPERATION TIME, MEMORY USAGE, OR OTHER COMPUTING RESOURCE USAGE, ASSOCIATED WITH DETERMINING, FROM A SET OF DATA ELEMENTS, AT LEAST TWO DATA ELEMENTS, ASSOCIATED WITH A TARGET COMPUTING OPERATION RESULT

CROSS-REFERENCE TO RELATED APPLICATIONS

This application is a continuation of International Application No. PCT/IB2019/0012797, filed on Dec. 10, 2019, which claims priority to (as a continuation-in-part) and benefit of U.S. application Ser. No. 16/221,904, filed on Dec. 17, 2018, and issued on Aug. 27, 2019 as U.S. Pat. No. 10,394,555, all of which are incorporated by reference herein for all purposes.

TECHNICAL FIELD

This disclosure is directed to computing network architectures for reducing time and memory usage associated with computing operations.

BACKGROUND

There is a need to reducing computer operation time and memory usage associated with selecting data subsets in complex computing networks.

BRIEF SUMMARY

In some embodiments a method is provided for reducing a computing operation time or computing resource usage associated with determining at least two data elements, associated with a target computing operation result, from a set of data elements, the method comprising:

receiving or accessing, using one or more computing device processors, a first set of data elements, wherein the first set comprises two or more data elements, wherein a first data element of the two or more data elements is associated with a first index of the first set, and a second data element of the two or more data elements is associated with a second index of the first set;

receiving or accessing, using the one or more computing device processors, a target computing operation result, wherein the target computing operation result is based on at least one computing operation;

determining or generating, using the one or more computing device processors, a second set of mapped data elements mapped via one or more indexes to the first set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the target computing operation result, utilizing a physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the first set;

determining, using the one or more computing device processors, and using the related index information associated with the at least two data elements of the first set, the at least two data elements of the first set, wherein the at least one computing operation involving the at least two data elements of the first set results in the target operation result;

deleting the second set from the physical or virtual memory, or overwriting, in the physical or virtual memory, the second set with data.

In some embodiments, the first mapped data element comprises a product of the first data element multiplied by a difference between the target computing operation result and the first data element, and wherein the second mapped data element comprises a product of the second data element multiplied by a difference between the target computing operation result and the second data element.

In some embodiments, a method is provided for reducing a computing operation time or computing resource usage associated with determining at least three data elements, associated with a target computing operation result, from a set of data elements, the method comprising:

receiving or accessing, using one or more computing device processors, a first set of data elements, wherein the first set comprises three or more data elements, wherein a first data element of the two or more data elements is associated with a first index of the first set, and a second data element of the three or more data elements is associated with a second index of the first set;

receiving or accessing, using the one or more computing device processors, a target computing operation result, wherein the target computing operation result is based on at least one computing operation;

receiving or accessing, using one or more computing device processors, an arbitrary data element of the first set;

performing an equivalence-determining computing operation comprising:

executing, using the one or more computing device processors, an intermediate computing operation based on the target computing operation result and the arbitrary data element of the first set, wherein the intermediate computing operation comprises determining, using the one or more computing device processors, an intermediate computing operation result based on the arbitrary data element and the target computing operation result;

determining or generating, using the one or more computing device processors, a second set of mapped data elements mapped via one or more indexes to the first set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined or generated based on at least the intermediate computing operation result, utilizing a physical or virtual memory for storing the second set;

determining, using the one or more computing device processors, whether there is equivalence between at least two mapped data elements of the second set; and in response to determining the equivalence between the at least two mapped data elements of the second set:

determining, using the one or more computing device processors, index information associated with the at least two mapped data elements of the second set;

determining, using the one or more computing device processors, and based on the index information associated with the at least two mapped data elements of the second set, related index information associated with at least two data elements of the first set;

determining, using the one or more computing device processors, and using the related index information associated with the at least two data elements of the first set, the at least two data elements of the first set, wherein the at least one computing operation involving the arbitrary data element and the at least two data elements of the first set results in the target operation result;

deleting the second set from the physical or virtual memory, or overwriting, in the physical or virtual memory, the second set with data.

In some embodiments, the method comprises, in response to determining no equivalence between the at least two mapped data elements of the second set, receiving or accessing, using one or more computing device processors, a second arbitrary data element of the first set; and performing a second equivalence-determining computing operation, based on the second arbitrary data element of the first set.

In some embodiments, the first mapped data element comprises a product of the first data element multiplied by a difference between the intermediate computing operation result and the first data element, wherein the second mapped data element comprises a product of the second data element multiplied by a difference between the intermediate computing operation result and the second data element.

In some embodiments, a method is provided for reducing a computing operation time or computing resource usage associated with determining at least four data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

determining or generating, using the one or more computing device processors, an intermediate set of data elements, wherein a first data element of the intermediate set is based on a combination computing operation involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the target computing operation result and based on at least one data element of the intermediate set, utilizing a physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, a first data element at a first index of the first set and a second data element at a second index of the first set, and a third data element at a third index of the first set and a fourth data element at a fourth index of the first set, wherein the first index, the second index, the third index, and the fourth index are different from each other, wherein the first data element of the first set and the second data element of the first set were used to determine or generate, using the combination computing operation, a first data element of the at least two data elements of the intermediate set, wherein the third data element of the first set and the fourth data element of the first set were used to determine or generate, using the combination computing operation, a second data element of the at least two data elements of the intermediate set, and wherein the at least one computing operation involving the first data element of the first set, the second data element of the first set, the third data element of the first set, and the fourth data element of the first set results in the target operation result; and deleting the second set or the intermediate set from the physical or virtual memory, or overwriting, in the physical or virtual memory, the second set or the intermediate set with data.

In some embodiments, the two data elements of the first set located at two different indexes of the first set are not used in combination to determine any other data element of the intermediate set.

In some embodiments, a method is provided for reducing a computing operation time or computing resource usage associated with determining at least five data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, an arbitrary data element of the first set;

performing an equivalence-determining computing operation comprising:

executing, using the one or more computing device processors, an intermediate computing operation based on the target computing operation result and the arbitrary data element of the first set, wherein the intermediate computing operation comprises determining, using the one or more computing device processors, an intermediate computing operation result based on the arbitrary data element and the target computing operation result;

determining or generating, using the one or more computing device processors, an intermediate set of data elements, wherein a first data element of the intermediate set is based on a combination computing operation involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the intermediate computing operation result and based on at least one data element of the intermediate set, utilizing a physical or virtual memory for storing the second set;

determining, using the one or more computing device processors, whether there is equivalence between at least two mapped data elements of the second set; and in response to determining the equivalence between the at least two mapped data elements of the second set:

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, a first data element at a first index of the first set and a second data element at a second index of the first set, and a third data element at a third index of the first set and a fourth data element at a fourth index of the first set, wherein the first index, the second index, the third index, and the fourth index are different from each other, wherein the first data element of the first set and the second data element of the first set were used to determine or generate, using the combination computing operation, a first data element of the at least two data elements of the intermediate set, wherein the third data element of the first set and the fourth data element of the first set were used to determine or generate, using the combination computing operation, a second data element of the at least two data elements of the intermediate set, and wherein the at least one computing operation involving the first data element of the first set, the second data element of the first set, the third data element of the first set, the fourth data element of the first set, and the arbitrary data element, results in the target operation result; and deleting the second set or the intermediate set from the physical or virtual memory, or overwriting, in the physical or virtual memory, the second set or the intermediate set with data.

In some embodiments, the method comprises, in response to determining no equivalence between the at least two mapped data elements of the second set, receiving or accessing, using one or more computing device processors, a second arbitrary data element of the first set; and performing a second equivalence-determining computing operation, based on the second arbitrary data element of the first set.

In some embodiments, a method is provided for reducing a computing operation time or computing resource usage associated with determining target data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, a target number of data elements associated with the target computing operation result;

determining or generating, using the one or more computing device processors, an intermediate set of data elements, wherein a first data element of the intermediate set is based on a combination computing operation, based on the target number of data elements, and involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the target computing operation result and based on at least one data element of the intermediate set, utilizing a physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, the target data elements of the first set, wherein each index of each target data element of the target data elements is different;

wherein the at least one computing operation involving the target data elements of the first set results in the target operation result; and deleting the second set or the intermediate set from the physical or virtual memory, or overwriting, in the physical or virtual memory, the second set or the intermediate set with data.

In some embodiments, a method is provided for reducing a computing operation time or computing resource usage associated with determining target data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, a target number of data elements associated with the target computing operation result;

receiving or accessing, using the one or more computing device processors, an arbitrary data element of the first set;

performing an equivalence-determining computing operation comprising:

executing, using the one or more computing device processors, an intermediate computing operation based on the target computing operation result and the arbitrary data element of the first set, wherein the intermediate computing operation comprises determining, using the one or more computing device processors, an intermediate computing operation result based on the arbitrary data element and the target computing operation result;

determining or generating, using the one or more computing device processors, an intermediate set of data elements, wherein a first data element of the intermediate set is based on a combination computing operation, based on the target number of data elements, and involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the intermediate computing operation result and based on at least one data element of the intermediate set, utilizing a physical or virtual memory for storing the second set;

determining, using the one or more computing device processors, whether there is equivalence between at least two mapped data elements of the second set; and in response to determining the equivalence between the at least two mapped data elements of the second set:

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, the target data elements of the first set, wherein each index of each target data element of the target data elements is different;

wherein the at least one computing operation involving the target data elements of the first set and the arbitrary data element results in the target operation result; and deleting the second set or the intermediate set from the physical or virtual memory, or overwriting, in the physical or virtual memory, the second set or the intermediate set with data.

In some embodiments, the method comprises, in response to determining no equivalence between the at least two mapped data elements of the second set, receiving or accessing, using one or more computing device processors, a second arbitrary data element of the first set; and performing a second equivalence-determining computing operation, based on the second arbitrary data element of the first set.

In some embodiments, a method is provided for reducing a computing operation time or computing resource usage associated with determining target data elements, associated with a target computing operation result, from a set of data elements, the method comprising:

receiving or accessing, using one or more computing device processors, a first set of data elements;

partitioning the first set into two or more subsets of data elements, wherein a first data element present in a first subset of the two or more subsets is not present in a second subset of the two or more subsets;

receiving or accessing, using the one or more computing device processors, a target computing operation result, wherein the target computing operation result is based on at least one computing operation;

receiving or accessing, using the one or more computing device processors, a target number of data elements associated with the target computing operation result;

splitting the target number of data elements associated with the target computing operation result into two or more mini-target numbers of data elements;

performing at least one equivalence-determining computing operation using at least one mini-target number of data elements of the two or more mini-target number of data elements and using at least one subset, or a combination of two or more subsets, of the two or more subsets of data elements, wherein a first equivalence-determining computing operation of the at least one equivalence-determining computing operation comprises:

determining or generating, using the one or more computing device processors, an intermediate set of data elements, wherein a first data element of the intermediate set is based on a combination computing operation based on a first mini-target number of data elements, and involving at least two data elements of the first set associated with at least two different indexes of the at least one subset or the combination of two or more subsets;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, wherein each of the two or more mapped data elements is determined based on at least the target computing operation result and based on at least one data element of the intermediate set, utilizing a physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, target data elements of the at least one subset or the combination of two or more subsets, wherein each target data element of the at least one subset or the combination of two or more subsets is associated with a different index of the first set;

deleting the second set or the intermediate set from the physical or virtual memory, or overwriting, in the physical or virtual memory, the second set or the intermediate set with data, wherein the at least one computing operation involving the target data elements of the at least one subset, or the combination of two or more subsets, resulting from the first equivalence-determining computing operation, results in the target computing operation result.

BRIEF DESCRIPTION OF THE DRAWINGS

FIG. 3 is a method diagram for reducing time and memory usage associated with determining a subset, in accordance with some embodiments of the invention.

Figure 1:
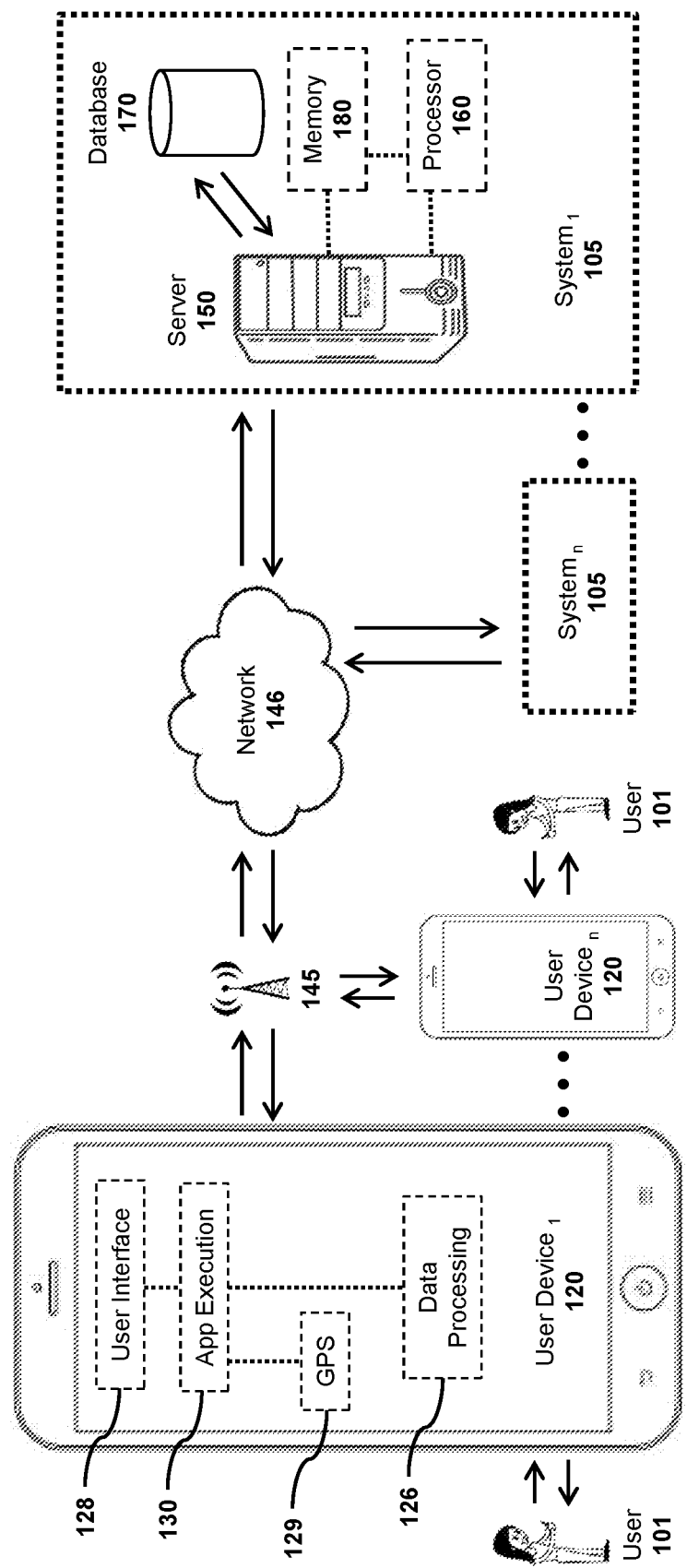
FIG. 1 is a network diagram for executing any methods described herein, in accordance with some embodiments of the invention.

All of these drawings are illustrations of certain embodiments. The scope of the claims is not limited to the specific embodiments illustrated in the drawings and described herein.

DETAILED DESCRIPTION OF THE EMBODIMENTS

In some embodiments, any computing device, system, or apparatus described herein may be a mobile or non-mobile computing device, a mobile phone, laptop, tablet, watch, e-reader, headgear, eyewear, a front-end or back-end server, etc. Any computing device may have voice and data capabilities. In some embodiments, the term "data" may refer to "signal" or "information." In some embodiments, the terms "signal," "data," and "information" may be used interchangeably. Any reference to data may also include references to the contents of the data. Any signals described herein may be electronic or electromagnetic signals. Additionally, any signals described herein may be either be transitory or non-transitory signals. Additionally, any signals described herein may be analog signals, digital signals, and/or mixed analog and digital signals. The terms "system," "apparatus," "server," "box," "agent," "device," "unit," "sub-unit," "element," "application," "infrastructure," etc., may be used interchangeably in some embodiments. In some embodiments, any data or data set described herein may be structured or unstructured. In some embodiments, a method is provided for performing the various steps performed by any system described herein. In some embodiments, a non-transitory computer-readable medium comprising code is provided for causing a system to perform the various methods described herein. In some embodiments, a system may comprise a housing that includes various units, such as those illustrated in FIG. 3. In some embodiments, a chipset may be disposed in the housing and may be interfaced with a processor. The chipset may have hardware (e.g., electronic components in an electronic circuit) for supporting various connections within the system, or any other connection from the system to external systems.

FIG. 1 describes a schematic block diagram of a network system for reducing time and memory usage associated with computing operations. While the user device 120 is shown as a mobile phone, in other embodiments, the user device 120 may be any other mobile or non-mobile computing device, including Internet of Things (IoT) devices. The illustrated network 146, such as the internet or an intranet, can be used to exchange data between the server 150 and the user device 120.

According to some embodiments, a user 101 and/or another computer interacts with the disclosed systems 100 for determining a subset from a set according to the methods disclosed herein. Disclosed user devices 120 may include computing device capable of sending data and communicating over the internet with one or more servers 150, other user devices 120, or other type of computing devices. The methods described herein may be executed by at least one of the user device 120 (e.g., using the app execution 130 and data processing 126 systems), the server 150 (e.g., using the processor 160), or a combination of both.

A wireless communications network 145 may be a 3G network, 4G, LTE, 5G, Wi-Fi, Bluetooth, or any other network protocol and may be a combination of any number of networks. Further, as mentioned above a wired network connection such as a conventional Ethernet connection could be used, such as with a personal computer with an Ethernet port. User devices 120 or servers 150 may include processors 430 such as digital signal processors or a microprocessors for performing the different methods described in this specification.

Although the servers 150 illustrated in the present figure are illustrated as stand-alone computing machines, the computing functionality, including servers 150, processors or processor instances 160, memory or computing data storage areas 180, and databases 170 can be provided through a cloud implementation such as Amazon Web Services or by a hybrid enterprise/cloud architecture. It is understood that the terms system, apparatus, device, etc. may be used interchangeably in this specification. In some embodiments, a method is provided for performing the various steps performed by any computing device, e.g. user device 120 and/or server 150, described herein. In some embodiments, a non-transitory computer-readable medium comprising code is provided for causing any user device 120, computing device, or server 150, to perform the various methods described herein. The scope of any claims that may be a part of this application or any application stemming from the present application shall be determined by those claims as read in light of the claims, but the elements of the particularly illustrated embodiments shall not be imputed to the claim language unless particularly invoked through the use of means-plus-function language under 35 U.S.C. Section 112(f).

Figure 2:
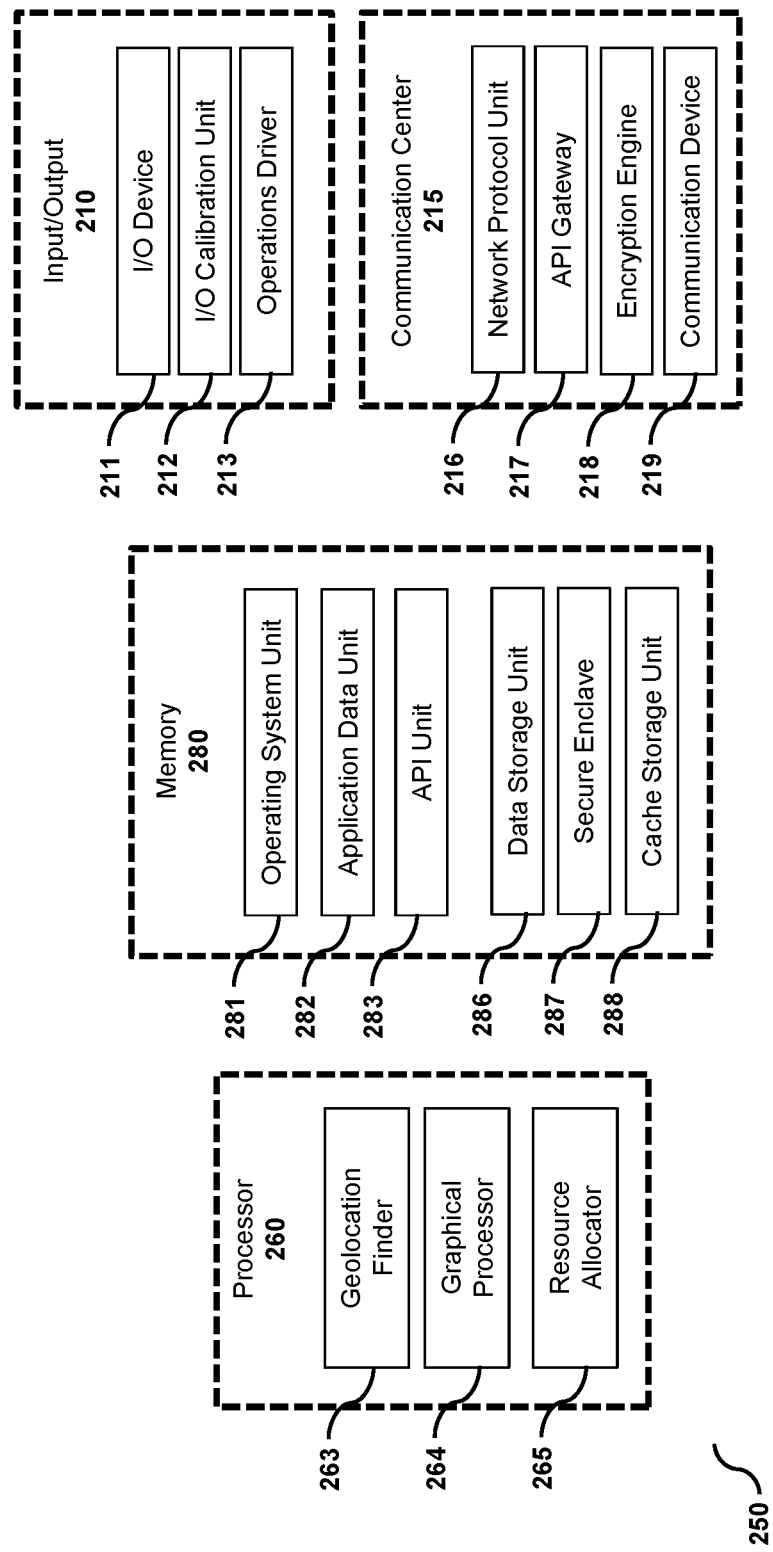
FIG. 2 is a system diagram for executing any methods described herein, in accordance with some embodiments of the invention.

FIG. 2 illustrates an exemplary complex computing environment, in accordance with some embodiments of the invention. For example, the computing environment may be included in and/or utilized by the system, the user device, and/or any other system described herein. The computing environment and/or any of its units and/or sub-units described herein may include general hardware, specifically-purposed hardware, and/or specially purposed-software.

The computing environment may include, among other units, a processor 260, a memory 280, an input/output (I/O) unit 210, and a communication center 215. As described herein, each of the processor, the memory, the I/O unit, and/or the communication unit may include and/or refer to a plurality of respective units, sub-units, and/or elements. The various units may be implemented entirely in hardware, entirely in software, or in a combination of hardware and software. Some of the units may be optional. Any software described herein may be specially purposed software for performing a particular function. In some embodiments, hardware may also be specially purposed hardware for performing some particular functions. Furthermore, each of the processor, the memory unit, the I/O unit, the communication unit, and/or the other units in FIG. 2, may be operatively and/or otherwise communicatively coupled with each other using a chipset such as an intelligent chipset. The chipset may have hardware for supporting connections in the computing environment and connections made to external systems from the computing environment. While various units of FIG. 2 are presented as separate units, some of the units may be comprised in other units. Additionally, some of the units may be optional. Additionally, one or more units may be coupled or connected (e.g., via a wired or wireless connection) to other units. For example, the processor may be connected to one or more other units in FIG. 2.

As illustrated in FIG. 2, a server 250 (which may be the system 105 or may be comprised in the system 105) may include, among other elements, any combination of a processor 260, a memory 280, an input/output (I/O) 210, and a communication center 215. As described in present embodiments, each of the processor 260, the memory 280, the I/O 210, and communication center 215 may include a plurality of respective units, subunits, and/or elements. Furthermore, each of the processor 260, the memory 280, the I/O 210, and the communication center 215 may be operatively or otherwise communicatively coupled with each other so as to facilitate the methods and techniques described herein.

The processor 260 may control any one or more of the memory 280, the I/O 20, the communication center 215, or any other unit which may include the server 250, as well as any included subunits, elements, components, devices, or functions performed by each or a combination of the memory 280, the I/O 210, the communication center 215 or any other unit which may include the server 250. Any of the elements or sub-elements of the server 250 presented here may also be included in a similar fashion in any of the other units, subunits, and devices included in the operating system 100 of FIG. 1. Additionally, any actions described herein as being performed by a processor 260 may be taken by the processor 260 alone, or by the processor 260 in conjunction with one or more additional processors, units, subunits, elements, components, devices, and the like. Additionally, while only one processor 260 may be shown in the figures included here, multiple processors may be present or otherwise included in the server 250 or elsewhere in the operating system of FIG. 1. Thus, while instructions may be described as being executed by the processor 260 or the various subunits of the processor 263, 264, 265, the instructions may be executed simultaneously, serially, or otherwise by one or more multiple processors 260.

In some embodiments, a processor 260 may be implemented as one or more computer processor (CPU) chips, graphical processor (GPU) chips, or some combination of CPU chips and GPU chips, and may include a hardware device capable of executing computer instructions. The processor 260 may execute any combination of instructions, codes, computer programs, and scripts. The instructions, codes, computer programs, and scripts may be received from, stored in, or received from and stored in any combination of the memory 280, the I/O 210, the communication center 215, subunits of the previously described elements, other devices, other computing environments. In some embodiments, various portions of any of the methods described herein may be executed either in series or in parallel.

In some embodiments, the processor 260 may include, among other elements, subunits. Subunits may include any combination of a geolocation finder 263, a graphical processor 264, and a resource allocator 265. Each of these subunits of the processor 260 may be communicatively or otherwise operably coupled with each other. Any of the subunits described with respect to any units or systems may be optionally included those units or systems.

The geolocation finder 263, particularly in communication with geolocation information provided by GPS subsystems 129 of user devices 120 (see FIG. 1) may facilitate any combination of detection, generation, modification, analysis, transmission, and presentation of location information. Location information may include any combination of global positioning system (GPS) coordinates, an internet protocol (IP) address, a media access control (MAC) address, geolocation information, an address, a port number, a zip code, a server number, a proxy name, a proxy number, device information, serial numbers, and the like. In some embodiments, the geolocation finder 263 may include any one or a combination of various sensors, specifically-purposed hardware elements for enabling the geolocation finder 263 to acquire, measure, and transform location information.

The graphical processor (GPU) 264 may facilitate any combination of generation, modification, analysis, processing, transmission, and presentation of visual content. In some embodiments, the GPU 264 may be configured to receive multiple images from a user and perform analysis on and/or modifications to the images. Further, the GPU 264 may be configured to facilitate adjustments to videos and images associated with a user. The GPU 264 may also be configured to render visual content for presentation on a user device 120 and/or to analyze visual content for metadata associated with a user or a user device. The GPU 264 may include multiple GPUs and may therefore be configured to perform and/or execute multiple processes in parallel.

The resource allocator 265 may facilitate any one or combination of the determination, monitoring, analysis, and allocation of resources throughout the server 250, the system 100, any component of the system 100, or other computing environments. For example, the resource allocator 265 may facilitate interaction between the server 250, any subunit of the server 250, and a high volume (e.g. multiple) of users or associated user devices 120. As such, computing resources of the server 250 utilized by any one or a combination of the processor 260, the memory 280, the I/O 210, the communication center 215, and any subunit of these units, such as processing power, data storage space, network bandwidth, and the like may be in high demand at various times during operation. Accordingly, the resource allocator 265 may be configured to manage the allocation of various computing resources as they are required by particular units or particular subunits of the server 250.

In some embodiments, the resource allocator 265 may include sensors and/or other specially-purposed hardware for monitoring performance of each unit and/or subunit of the server 250, as well as hardware for responding to the computing resource needs of each unit or subunit. In some embodiments, the resource allocator 265 may utilize computing resources of a second computing environment separate and distinct from the server 250 to facilitate a desired operation.

In some embodiments, factors affecting the allocation of computing resources by the resource allocator 265 may include the number of ongoing user device connections and/or other communication channel connections, a duration during which computing resources are required by one or more elements of the server 250, and/or the like. In some embodiments, computing resources may be allocated to and/or distributed amongst a plurality of second computing environments included in the server 250 based on one or more factors mentioned above. In some embodiments, the allocation of computing resources of the resource allocator 265 may include one or more resource allocators 265 flipping a switch, adjusting processing power, adjusting memory size, partitioning a memory element, transmitting data, controlling one or more input and/or output devices, modifying various communication protocols, and the like. In some embodiments, the resource allocator 265 may facilitate utilization of parallel processing techniques such as dedicating a plurality of GPUs included in the processor 260 for processing high-quality analysis and manipulation of images and/or videos.

In some embodiments, the memory 280 may be utilized for one or any combination of storing, recalling, receiving, transmitting, and/or accessing various files and/or information during operation of the server 250. For example, the memory 280 may be utilized for storing recalling, and/or updating any datasets described herein. The memory 280 may include various types of data storage media such as solid state storage media, hard disk storage media, and any other type of data storage medium which may be known to a person of ordinary skill in the art. The memory 280 may include dedicated hardware elements such as hard drives and/or servers, as well as software elements such as cloud-based storage drives. For example, the memory unit 280 may include various subunits such as an operating system unit 281, an application data unit 282, an application programming interface (API) unit 283, a data storage unit 286, a secure enclave 287, and/or a cache storage unit 288.

The memory 280 and any of its subunits described here may include any one or any combination of random access memory (RAM), read only memory (ROM), and various forms of secondary storage. RAM may be used to store volatile data and/or to store instructions that may be executed by the processor 260. For example, the data stored may be any one or a combination of a command, a current operating state of the server 250, an intended operating state of the server 250, and the like. As a further example, data stored in the memory 280 may include instructions related to various methods and/or functionalities described here. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may include one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory 280 may include one or more databases for storing any data described here, e.g. the database 170 of FIG. 1. Additionally or alternatively, one or more secondary databases located remotely from the server 250 may be utilized and/or accessed by the memory 280.

The operating system unit 281 may facilitate deployment, storage, access, execution, and/or utilization of an operating system utilized by the server 250 and/or any other computing environment described herein. In some embodiments, the operating system may include various hardware and/or software elements that serve as a structural framework for enabling the processor 260 to execute various operations such as the analysis of data received from user devices 120, etc. The operating system unit 281 may further store various pieces of information and/or data associated with operation of the operating system and/or the server 250 as a whole, such as a status of computing resources (e.g., processing power, memory availability, resource utilization, and/or the like), runtime information, modules to direct execution of operations described herein, user permissions, security credentials, and the like.

The application data unit 282 may facilitate deployment, storage, access, execution, and/or utilization of an application utilized by the server 250 or any other computing environment described herein (e.g., a user device 120). For example, users may be required to download, access, and/or otherwise utilize a software application on a user device 120 such as a smartphone or other internet-enabled device in order for various operations described herein to be performed. As such, the application data unit 282 may store any information and/or data associated with the application which may allow the application and/or user device 220 to perform methods described herein. As such, information included in the application data unit 282 may enable a user to execute various operations described here. The application data unit 282 may further store various pieces of information and/or data associated with operation of the application and/or the server 250 as a whole, such as a status of computing resources (e.g., processing power, memory availability, resource utilization, and/or the like), runtime information, modules to direct execution of operations described herein, user permissions, security credentials, and the like.

The application programming interface (API) unit 283 may facilitate deployment, storage, access, execution, and/or utilization of information associated with APIs of the server 250 and/or any other computing environment described herein (e.g., a user device). For example, server 250 may include one or more APIs for enabling various devices, applications, and/or computing environments to communicate with the server 250, multiple other servers, databases, or other user devices. Accordingly, the API unit 283 may include API databases containing information that may be accessed and/or utilized by applications and/or operating systems of other devices and/or computing environments associated with the methods described herein. An API may direct communications between the background component of the user device 120 and the server 250. In some embodiments, each API database may be associated with a customized physical circuit included in the memory unit 280 and/or the API unit 283. Additionally, each API database may be public and/or private, and so authentication credentials may be required to access information in an API database.

The data storage unit 286 may facilitate one or more of deployment, storage, access, analysis, and utilization of data content by the server 250 and any other computing environment described herein (e.g., a user device). Data content may be text, numbers, images, videos, audio files, and any other form of media. For example, the data storage unit 286 may store one or more images which may be uploaded from a user device. Further, the data storage unit 286 may store one or more images which have been manipulated by any unit or subunit of a server 150 or user device. In some embodiments, the data storage unit 286 may communicate with the GPUs 264 to facilitate any of the processes described here.

The secure enclave 287 may facilitate secure storage of data. In some embodiments, the secure enclave 287 may include a partitioned portion of storage media included in the memory unit 280 that is protected by various security measures. For example, the secure enclave 287 may be hardware secured. In other embodiments, the secure enclave 287 may include one or more firewalls, encryption mechanisms, and/or other security-based protocols. Authentication credentials of a user may be required prior to providing the user access to data stored within the secure enclave 287. In some embodiments, the secure enclave 287 may store sensitive user information such as medical history, credit card data, and/or data associated with the progression of skin damage from ultraviolet radiation.

The cache storage unit 288 may facilitate short-term deployment, storage, access, analysis, and/or utilization of data. In some embodiments, the cache storage unit 288 may serve as a short-term storage location for data so that the data stored in the cache storage unit 288 may be accessed quickly. In some embodiments, the cache storage unit 288 may include RAM and/or other storage media types that enable quick recall of stored data. The cache storage unit 288 may include a partitioned portion of storage media included in the memory 280. In some embodiments, the cache storage unit 288 may store any data described herein.

The I/O unit 210 may include hardware and/or software elements for enabling the server 250 to receive, transmit, and/or present information. For example, elements of the I/O unit 250 may be used to receive user input from a user via a user device 220, and the like. In this manner, the I/O unit 210 may enable the server 250 to interface with a human user in a manner such that the user may use the methods described here. As described, the I/O unit 210 may include subunits such as any one or a combination of an I/O device 211, an I/O calibration unit 212, and/or operations driver 213.

The I/O device 210 may facilitate any one or any combination of the receipt, transmission, processing, presentation, display, input, and output of information as a result of executed processes described here. In some embodiments, the I/O device 210 may include a plurality of I/O devices. In some embodiments, the I/O device 210 may include one or more elements of any one or a combination of a user device 120, a server 250, and/or a similar device(s).

The I/O device 211 may include a variety of elements that enable a user to interface with the server 250. For example, the I/O device 211 may include a keyboard, a touchscreen, a button, a sensor, a biometric scanner, a laser, a microphone, a camera, an internet-enabled device, and/or another element for receiving and/or collecting input from a user. Additionally and/or alternatively, the I/O device 211 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 211 may communicate with one or more elements of the processor 260 and/or the memory unit 280 to execute operations described herein. For example, the I/O device 211 may include a display, which may utilize the GPU 264 to present media content stored in the data storage unit 286 to a user of a user device 120.

The I/O calibration unit 212 may facilitate the calibration of the I/O device 211. For example, the I/O calibration unit 212 may detect and/or determine one or more settings of the I/O device 211, and then adjust and/or modify settings so that the I/O device 211 may operate more efficiently. In some embodiments, the I/O calibration unit 212 may utilize an operations driver 213 (or multiple operations drivers) to calibrate the I/O device 211. The operations driver 213 may alternatively be installed on a user device 120 so that the user device 120 may recognize and/or integrate with the I/O device 211, thereby enabling media content to be displayed, received, generated, and the like. In some embodiments, the I/O device 211 may be calibrated by the I/O calibration unit 212 by based on information included in the operations driver 213.

The communication center 215 may facilitate establishment, maintenance, monitoring, and/or termination of communications between the server 250 and other devices such as user devices 120, other computing environments, third party server systems, and the like. The communication center 215 may further enable communication between various elements (e.g., units and/or subunits) of the server 250 as needed to perform the methods described herein. In some embodiments, the communication center 215 may include a network protocol unit 216, an API gateway 217, an encryption engine 218, and/or a communication device 219. The communication center 215 may include hardware and/or software elements.

The network protocol unit 216 may facilitate establishment, maintenance, and/or termination of a communication connection between the server 250 and another device (e.g. user device 120) by way of a network. For example, the network protocol unit 216 may detect and/or define a communication protocol required by a particular network and/or network type. Communication protocols utilized by the network protocol unit 216 may include Wi-Fi protocols, Li-Fi protocols, cellular data network protocols, Bluetooth® protocols, WiMAX protocols, Ethernet protocols, powerline communication (PLC) protocols, and the like. In some embodiments, facilitation of communication between the server 250 and any other device, as well as any element internal to the server 250, may include transforming and/or translating data from being compatible with a first communication protocol to being compatible with a second communication protocol. In some embodiments, the network protocol unit 216 may determine and/or monitor an amount of data traffic to consequently determine which particular network protocol is to be used for establishing a connection with a user device, transmitting data, and/or performing other operations described herein.

The API gateway 217 may facilitate the enablement of other devices and/or computing environments to access the API unit 283 of the memory 280 of the server 250. For example, a user device 120 may access the API unit 283 via the API gateway 217. In some embodiments, the API gateway 217 may be required to validate user credentials (e.g. login ID 225, password 226 of FIG. 2) associated with a user of a user device 120 prior to providing access to the API unit 283 to the user. The API gateway 217 may include instructions for enabling the server 250 to communicate with another device.

The encryption engine 218 may facilitate any one or any combination of translation, encryption, encoding, decryption, and decoding of information received, transmitted, and/or stored by the server 250. For example, the encryption engine 218 may encrypt data associated with a user's medical history, credit card information, analysis of skin damage from ultraviolet radiation, etc. Using the encryption engine, each transmission of data may be encrypted, encoded, and/or translated for security reasons, and any received data may be encrypted, encoded, and/or translated prior to its processing and/or storage. In some embodiments, the encryption engine 218 may generate any one or combination of an encryption key, an encoding key, a translation key, and the like, which may be transmitted along with any data content.

The communication device 219 may include a variety of hardware and/or software specifically purposed to enable communication between the server 250 and another device (e.g. user device 120), as well as communication between elements of the server 250. In some embodiments, the communication device 219 may include one or more radio transceivers, chips, analog front end (AFE) units, antennas, processors, memory, other logic, and/or other components to implement communication protocols (wired or wireless) and related functionality for facilitating communication between the server 250 and any other device. Additionally and/or alternatively, the communication device 219 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

In some embodiments, implementation of any unit of any system described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

In some embodiments, a method based on the disclosure described herein comprises searching unstructured information by five and more keywords (unstructured information may be raw unorganized information (not organized based on any data model) using a vector space (keywords are converted to numbers, applying hash functions to convert keywords to numbers, numbers are coordinates in vector space), and excluding the probabilistic and Boolean models (no arrays, trees, index arrays, and index trees; syntax and semantics of keywords do not matter.

The objective of information retrieval is to:

Find one or more elements in the set, and the desired elements must have a certain property. This property can be absolute or relative. The relative property characterizes in relation to others: for example, the minimal element in the set of numbers.

Retrieval systems (RS) working with electronic text documents can be conditionally divided into two categories: Information retrieval systems (IRS) and data retrieval systems (DRS). It is worth noting that this classification is conditional and in its context many modern search engines combine the properties, both DRS and IRS. Basic differences between DRS and IRS are presented in the table:

| RS | DRS | IRS |
| --- | --- | --- |
| Match the data to the search query | Absolute | Relative |
| Classification of documents | Deterministic | Relevant |
| Query language | Artificial | Natural |
| Criteria for selecting documents | Boolean relevance function | Relevance function |
| Resistance to errors in data and queries | Unstable | Stable |

An example of a DRS is a standard relational DBMS. SQL is a query language which artificial and allows you to set search queries (SQ) for an exact match or search by a given pattern. The main task for modern DRS is to provide reliable and efficient data storage, as well as high speed of SQ of the user. IRS, in turn, is intended to solve a more general search problem than to search for exact match, and where the ultimate goal of the search is the selection of relevant SQ information, the degree of relevance of which can be determined as the degree of its semantic proximity to the search query and this in turn leads to the fact that SQ in such systems should be based on natural language, i.e. in the same language in which the initial information is formulated. DRS and IRS work with some collection of documents. The original collection of documents can be considered as a list of records (documents), where each entry contains a certain list of words consisting of alphabet characters. In real SQ, the original set of documents may contain additional information describing documents that can also be used to perform a search. The key element when developing a modern IRS is the volumes of initial data, since requirements on search time and quality for search systems operating on relatively large volumes of data (ex. Web search or electronic libraries) are applied ever more stringent. Since at present the quantity of textual information presented in electronic form continues and is likely to grow exponentially, the issue of implementing effective, scalable and productive IRS for today remains open to researchers. After all, only on the Internet now, the amount of accessible and informative data according to analysts' estimates is about 4200 terabytes [The Deep Web: Surfacing Hidden Value. BrightPlanet LLC. http://www.brightplanet.com/deepcontent/tutorials/DeepWeb/index.asp].

Let us introduce some basic definitions:

Definition1: We introduce an alphabet as a finite set of symbols $A=\{\tau, \alpha_1, \ldots, \alpha_k\}$, where $\tau$—space symbol, $|A|=k$, and $k>0$—number of alphabet symbols.

Definition2: A string/line of length "n", we will introduce as a sequence of symbols $T=\{t_1, \ldots, t_n, \$\}$, where $\forall i, t_i \in A$ and \$—special symbols, which do not belong to the alphabet and denotes the end of the string/line.

Definition3: A string/line "w" that does not contain the pace symbol $\tau$ is introduced as a word and we assume that the set of words "W" is always finite.

Definition4: Search template/pattern $P=\{p_1, \ldots, p_m\}$ we call a string/line consisting of a non-empty finite set of words separated by a space symbol $\tau$. In this particular case $|P|=m$—length of the template/pattern in symbols, $p_i \in W$, where "i"—number of the word in the template/pattern and "W"—set of words. Words in search templates/patterns and documents we call terms (or keywords).

Comment:

The length of the search template/pattern "P" will always be denoted by the symbol "m", and the total length of the original data T for which the search problem will be solved is denoted by "n".

P and NP Tasks:

The search tasks relate to the tasks P (polynomial) and NP (non-deterministic polynomial). Let's briefly consider these concepts:

The class P is defined quite simply—it is a set of such problems for which we know a computing operation that works in polynomial time. For simplicity, we can assume that the class P is a class of simple problems, since we know fast computing operations for solving them. Examples of tasks from class P: addition of two numbers, sorting of a set of n elements, searching for an element in a certain set, finding out the connectivity of a graph, and so on.

The NP class is defined as a problem for which we can only test some solution in polynomial time, but we do not know a computing operation that could solve the problem just as quickly. Examples of problems from the class NP: the subset sum problem, the problem of a backpack, the traveling salesman problem, the factorization of a number into prime factors, so on.

The Subset Sum Problem:

Task 1. Given "n" numbers and the number "s". It is required to find out whether there exists a subset of "m" numbers whose sum of elements is equal to "s".

Task 2. There is a table 2×n given number "s". It is necessary to find 2 numbers from different lines giving in the sum "s".

Computing Operation 1. Full bust. Operating time—$O(n^2)$.

Computing Operation 2 Bust with sorting. Sort the first line, for each element from the second line, subtract it from s and look for this difference in the first line.

Task 3. There is a table 3×n a given number "s". It is necessary to find 3 numbers from different lines giving in the sum "s".

Example. Given: 17 43 23 38 14 20 36 47. Is there a subset with a sum of 100?

Computing Operation 1. Full bust. Operating time—$O(n^3)$.

Computing Operation 2. For a single line, find all the differences with s, for the other two, sort through all the options. Operating time—$O(n^2)$.

Computing Operation 3. Task3 can be applied to a vector model.

Task 4. There is a table 4×n a given number "s". It is necessary to find 4 numbers from different lines giving in the sum "s".

Example. Given: 50 2 47 5 21 4 78 1. Is there a subset with a sum of 100?

Computing Operation 1. There is a Schroeppel-Shamir operation with an operating time—$O(n^2 \log n)$, requirement on memory—$O(n)$.

Task5. The coordinates of n points on the plane are given. It is required to determine whether any three of them lie on one line.

Computing Operation 1. The computing operation is implemented on the basis of a polynomial of the third degree.

Open Questions:

Given "n" numbers and the number "s". It is required to find out whether there exists a subset of three numbers whose sum of elements is equal to "s" and with the time of operation—$O(n^2)$.

Given "n" numbers and the number "s". It is required to find out whether there exists a subset of four numbers whose sum of elements is equal to "s" and with the time of operation—$O(n^3)$.

Are there other approaches to solving the subset sum problem with a better operating time than the above?

The seventh problem of the millennium: the equality of classes P=NP? The Klein Institute for the solution of this problem offers a reward of one million dollars.

Formulation of the subset sum problem:

It is given a set of natural numbers $(x_1, x_2, \ldots, x_n) \in X^n$ with 'n' dimension. We need to find out if there is a subset $X_m$ with 'm' dimension ($|X_m|=m$), where relations are fulfilled as follows:

$$X_m = \{x_i + x_j + \ldots + x_g + x_h = S; i \neq j \neq \ldots \neq g \neq h; \\ (x_i, x_j, \ldots, x_g, x_h) \in X^n; (i, j, \ldots, g, h) \in N = (1, \\ 2, \ldots, n), \text{amount of elements from } x_i \text{ to } x_h, \text{ is } \\ \text{equal to '}m', m < N\} \quad (1)$$

The subset $X_m \subseteq X^n$ is a collection of elements ($x_i$, $x_j$, ..., $x_g$, $x_h$) with mismatched indices. The number or quantity of subsets $X_m$ may be one or several.

Let us now come to solving practical problems which are arised from the formulation of the subset sum problem (1).

Problem 1. We need to find out if there is subset:

$$X_2 = \{x_i + x_j = S; i \neq j; x_i, x_j \in X^n; i,j, \in N\} \quad (2)$$

Problem 2. We need to find out if there is subset:

$$X_3 = \{x_i + x_j + x_k = S; i \neq j \neq k; x_i, x_j, x_k \in X^n; i,j,k, \in N\} \quad (3)$$

Problem 3. We need to find out if there is subset:

$$X_4 = \{x_i + x_j + x_k + x_l = S; i \neq j \neq k \neq l; x_i, x_j, x_k, x_l \in X^n; i,j,k,l, \in N\} \quad (4)$$

Problem 4. We need to find out if there is subset:

$$X_5 = \{x_i + x_j + x_k + x_l + x_m = S; i \neq j \neq k \neq l \neq m; x_i, x_j, x_k, x_l, x_m \in X^n; i,j,k,l,m \in N\} \quad (5)$$

To solve the set problems let us introduce the mapping of the set $X^n$ in the set $Y^n$:

$$\tau(S,x) = (S-x)x, x \in X^n \quad (6)$$

Based on mapping (6) we have:

$$Y^n = \{y_1, y_2, \ldots, y_n | \tau(S, x_i) = y_i; x_i \in X^n; i = 1, 2, \ldots, n\} \quad (7)$$

Now we introduce the identity.

Let among the set $Y^n$ there are such elements which perform identity:

$$y_i = y_j; i \neq j; i, j \in N \quad (8)$$

Then it is right that:

Lemma 1. Let there is identity (8) for the set (7). Then the problem 1 is solvable.

Proof (evidence): From the identity (8) we have:

$$y_i = \tau(S, x_i) = (S - x_i)x_i = x_j x_i, \text{supposing that } x_j = S - x_i$$

From the other hand $y_j = \tau(S, x_j) = (S - x_j)x_j = x_i x_j$, similarly supposing that $x_i = S - x_j$. In fact $x_i$ and $x_j$ are the roots of the quadratic equation $x^2 - Sx + C = 0$. According to Vieta theorem $C = x_i \cdot x_j$. Then we have $y_i = y_j = x_i \cdot x_j$. Which means fulfillment of the identity (8). Then there are elements $x_i$ and $x_j$ that fulfil $x_i + x_j = S$. Q.E.D.

Let us now solve the problem 2.

Let us enter value $S(x_k) = S - x_k, x_k \in X^n \quad (9)$

Lemma 2. Let for some elements $x_k \in X^n$ and taking into account formula (9) identity (8) is fulfilled for $k \neq i \neq j$; i, j, k $\in N$. Then the problem 2 is solvable.

Proof (evidence). In fact from the identity (8) taking into account formula (9) we have:

$\tau(S(x_k), x_i) = (S(x_k) - x_i)x_i = x_j x_i$, supposing that $(S(x_k) - x_i) = x_j$. On the other hand $\tau(S(x_k), x_j) = (S(x_k) - x_j) \cdot x_j = x_i x_j$, similarly supposing that $x_i = S(x_k) - x_j$. Which means that conditions of Lemma 1 are fulfilled with taking into account formula (9), i.e. we have $x_i + x_j + x_k = S'$. It is supposed that element $x_k$ is a non-repeating element (or in alternative embodiments, is a repeating element). Q.E.D.

To solve problem 3 let us make the following partition of S (partition of the value S'):

$$S' = x_i + x_j, S'' = x_k + x_l, x_i, x_j, x_k, x_l \in X^n;$$

$$i \neq j \neq k \neq l; i, j, k, l \in N. \quad (10)$$

$$S = S' + S'', S' \neq S''. \quad (11)$$

Then it is right that:

Lemma 3. Let for each of the value S' and S'' defined by the formula (10) Lemma 1 is applicable if the relationship (11) is right. Then the problem 3 is solvable.

Proof (evidence). Formulas (10) and (11) allow to apply Lemma 1 and to parallelize solving problem 3 i.e. simultaneously solved problems for S' and S'', and subsets $X_2'$, $X_2''$ are formed respectively. Combining these subsets $X_2 = X_2' \cup X_2''$ with mismatched indices is done on the basis of equality $S = S' + S''$. Q.E.D.

Let us now solve problem 4.

Similar to the solution of the problem 3 let us make following partition:

$$S'' = x_i + x_j, S''' = x_k + x_l + x_m; x_i, x_j, x_k, x_l, x_m \in X^n; i \neq j \neq k \neq l \neq m;$$

$$i, j, k, l, m \in N \quad (12)$$

$$S = S' + S'', S' \neq S'' \quad (13)$$

Lemma 4. Let for each of the value S' and S'' defined by the formula (12) Lemma 1 and Lemma 2 are applicable if the relationship (13) is right. Then the problem 4 is solvable.

Proof (evidence). Lemma is based on Lemma 1 and Lemma 2 for the values of S' and S'' respectively. And subsets $X_2'$ and $X_3''$ are formed. Combining these subsets $X_5 = X_2' \cup X_3''$ with mismatched indices is done on the basis of relationship (13). Q.E.D.

Computing operations for solving problem 1.

Operation 1. Input of the initial data: $X^n$, n, S.

Operation 2. Set $Y^n$ is formed on the basis of mapping (6).

Operation 3. Identity (8) verification and forming the subset $$X_2 = \{\tau(S, x_i) - \tau(S, x_j) = 0 | x_i, x_j \in X^n; i \neq j; i, j \in N\}$$

Operation 4. Output of the subset $X_2$.

Operation time is $T = O(n)$, memory requirements for forming the set $Y^n$ is $M = O(n)$. For comparison, operation time of the 2-table sum is $T = O(n \log n)$.

Note. Maximum quantity of pairs in the set $Y^n$ will be $m = [n/2]$. So the quantity of pairs in the set $Y^n$ may change from 1 to m. Also there is a need to highlight the fact that given computing operations for solving problem 1 with little modification will find all the subsets $X_2$.

Computing operations for solving problem 2.

Operation 1. Input of the initial data: set $X^n$, n, S.

Operation 2. Calculation of $S(x_k) = S - x_k$, $x_k \in X^n$ on the basis of formula (9).

Operation 3. Identify (8) verification and forming the subset $$X_3 = \{\tau(S(x_k), x_i) - \tau(S(x_k), x_j) = 0 | x_i, x_j, x_k \in X^n; i \neq j, \neq k; i, j, k \in N\}.$$

Operation 4. Output of the subset $X_3$.

According to the Note above operation time for computing operations for solving problem 2 is $T = O((n-2m) \cdot 2m)$, where 'm'—quantity of subsets $X_2$, 'n-2m'—quantity of indices left to choose index 'k' for the element '$x_k$'. Memory requirement $M = O(n)$. For comparison, operation time of the 3-table sum is $T = O(n^2)$.

Computing operations for solving problem 3.

Operation 1. Input of the initial data: $X^n$, n, S.

Operation 2. Partition of $S = S' + S''$ on the basis formula (10).

Operation 3. Forming of the subset $X_2'$ for the S':

$$X_2' = \{\tau(S', x_i) - \tau(S', x_j) = 0 | x_i, x_j \in X^n; i \neq j; i, j \in N\}$$

Operation 4. Forming of the subset $X_2''$ for the S'':

$$X_2'' = \{\tau(S'', x_k) - \tau(S'', x_l) = 0 | x_k, x_l \in X^n; k \neq l; k, l \in N\}$$

Operation 5: Forming of the subset $X_4$:

$X_4 = \{X_2' \cup X_2''\}$—combining $X_2'$ and $X_2''$ subsets with mismatched indices on the basis of formula (11).

Operation 6. Output of the subset $X_4$.

Operation time is $T = 2*O(n)$, memory requirement $M = 2*O(n)$. For comparison, operation time of the 4-table sum is $T=O(n^2 \log n)$. In case if given computing operations for solving problem 3 are parallelized, then operation time would be $T=O(n)$.

Computing operations for solving problem 4.

Operation 1. Input of the initial data: set $X^n$, n, S.
Operation 2. Partition of S on S' and S" on the basis of formulas (12) and (13).
Operation 3. Forming of the subset $X_2$' for S' on the basis of computing operations for solving problem 1:

$$X_2'=\{\tau(S',x_i)-\tau(S',x_j)=0 | x_i,x_j \in X^n; i \neq j; i,j \in N\}$$

Operation 4. Forming of the subset $X_3$" for S" on the basis of computing operations for solving problem 2:

$$X_3''=\{\tau(S''(x_k),x_l)-\tau(S''(x_k),x_m)=0 | x_k,x_l,x_m \in X^n; k \neq l \neq m; k,l,m \in N\}$$

Operation 5. Forming of the subset $X_5=\{X_2' \cup X_3''\}$—combining of $X_2'$ and $X_3''$ subsets with mismatched indices on the basis of formula (13).
Operation 6. Output of the subset $X_5$.

Operation time is $T=O(n)+O((n-2m)\cdot 2m)$, memory requirement is $M=2*O(n)$.

Conclusions
1. Computing operations to output further subsets $X_6$, $X_7$, $X_8$, ..., $X_m$ are determined on the basis of given computing operations for solving problems 1-4.
2. Also we need to note that given computing operations for solving problems 1-4 may be improved by Hoare's method, Lomuto's method and other sorting methods. At the same time it should be mentioned that these sorting methods do not include exact way to determine pivot element. But when these sorting methods are used within given computing operations for solving problems 1-4, pivot element is easily determined which makes sorting more effective. Pivot element is determined on the condition of formula (function) (6) maximum.

Pivot element to be determined by the formula $x^*=S/2$ with the maximum value $y^*=S^2/4$.

In particular, computing operations for solving problem 1 with sorting (for ex., using Hoare's method) will improve operation time to:

$$T=O(n)+O((n-m)\log(n-m)), \text{ where}$$

$O(n)$—time needed for partition of the set $X^n$ to two subsets $X'(|X'|=m)$, $X''(|X''|=n-m)$ related to the pivot element $x^*$. If $n-m>m$, then sorting time for the subset $X''$ will be $T=O((n-m)\log(n-m))$, wherein subset $X'$ is sorted simultaneously with subset $X''$.

Comparison to 2, 3, 4—table sum operation time shows high effectiveness of new given computing operation for solving problems 1-4 together with less requirements on memory, hardware and other computing systems.

Practical application of given computing operation for solving problems 1-4:
1. information search;
2. security of banking systems;
3. encryption of information;
4. information coding;
5. cryptosystems and so on.

Example for solving problem 1:
We have set of numbers $X^7=\{x_1, x_2, x_3, x_4, x_5, x_6, x_7\}=\{2, 1, 6, 4, 3, 5, 3\}$. Dimension of the set n=7.
Problem we need to find out if this set includes subset $X_2$ with dimension m=2:

$$X_2=\{x_i+x_j=S=6; i \neq j; x_i,x_j \in X^7; i,j \in N=(1,2,3,4,5,6,7)\}$$

So, in terms of operation 1 we have initial data:

$$X^7=\{2,1,6,4,3,5,3\}; n=7; S=6.$$

Operation 2 is to transform set of $X^7$ on the basis of formula (6)
$\tau(S, x)=(S-x)x$. As the result we have:

$$Y^7=\{8,5,0,8,9,5,9\}=\{y_1,y_2,y_3,y_4,y_5,y_6,y_7\}$$

Operation 3 is to find identity (8): $y_i=y_j$, i, j, $\in N$ and on this basis find subset $X_2$:

$$y_1=y_4, S=x_1+x_4=2+4=6; X_2=\{x_1,x_4\}$$

$$y_2=y_6, S=x_2+x_6=1+5=6; X_2=\{x_2,x_6\}$$

$$y_5=y_7, S=x_5+x_7=3+3=6; X_2=\{x_5,x_7\}.$$

These are output of subset $X_2$ which is operation 4.
Example for solving problem 2:
We have set of numbers $X^9=\{x_1, x_2, x_3, x_4, x_5, x_6, x_7, x_8, x_9\}=\{17, 43, 23, 38, 14, 20, 10, 36, 47\}$ Dimension of the set n=9.

We need to find out if this set includes subset $X_3$ with dimension m=3:

$$X_3=\{x_i+x_j+x_k=S=100; i \neq j \neq k; x_i,x_j,x_k \in X^9; i,j,k \in N=(1,2,3,4,5,6,7,8,9)\}.$$

First we choose any arbitrary element, for ex: $x_7=10$. Then we calculate $S(x_k)$ on the basis of formula (9).

$$S(x_k)=S(x_7)=S-x_7=100-10=90.$$

Then we use transformation based on formula (6)

$$X_3=\{\tau(S(x_k),x_i)-\tau(S(x_k),x_j)=0 | x_i,x_j,x_k \in X^n; i \neq j, \neq k; i,j, k \in N:$$

$$y_1=(90-17)\cdot 17=73\cdot 17;$$

$$y_2=(90-43)\cdot 43=47\cdot 43;$$

$$y_3=(90-23)\cdot 23=67\cdot 23;$$

$$y_4=(90-38)\cdot 38=52\cdot 38;$$

$$y_5=(90-14)\cdot 14=76\cdot 14;$$

$$y_6=(90-20)\cdot 20=70\cdot 20;$$

$$y_7=(90-10)\cdot 10=80\cdot 10;$$

$$y_8=(90-36)\cdot 36=54\cdot 36;$$

$$y_9=(90-47)\cdot 47=43\cdot 47$$

Then we verify identity (8) or we have $y_2=y_9$, $S=x_2+x_9+x_7=43+47+10=100$
Subset $X_3=\{x_2, x_9, x_7\}$.
Example for solving problem 3:
We have set $X^9=\{50, 2, 47, 5, 21, 4, 7, 8, 1\}=\{x_1, x_2, x_3, x_4, x_5, x_6, x_7, x_8, x_9\}$. We need to find $x_i+x_j+x_k+x_l=S=100$.
So, let's use formula (10) for partition $S=S'+S''=49+51=100$.
Then for S'=49 we have:

$$y_1=(49-50)\cdot 50=-1\cdot 50;$$

$$y_2=(49-2)\cdot 2=47\cdot 2;$$

$$y_3=(49-47)\cdot 47=2\cdot 47;$$

$$y_4=(49-5)\cdot 5=44\cdot 5;$$

$$y_5=(49-21)\cdot 21=28\cdot 21;$$

$$y_6=(49-4)\cdot 4=45\cdot 4;$$

$$y_7=(49-7)\cdot 7=42\cdot 7;$$

$y_8=(49-8)\cdot 8=41\cdot 8;$ $y_9=(49-1)\cdot 1=48\cdot 1$

Using identity (8) we have $y_2=y_3$, $S'=x_2+x_3=2+47=49$. Similarly we do calculations for $S''=51$:

$y_1=(51-50)\cdot 50=1\cdot 50;$ $y_2=(51-2)\cdot 2=49\cdot 2;$ $y_3=(51-47)\cdot 47=4\cdot 47;$ $y_4=(51-5)\cdot 5=46\cdot 5;$ $y_5=(51-21)\cdot 21=30\cdot 21;$ $y_6=(51-4)\cdot 4=47\cdot 4;$ $y_7=(51-7)\cdot 7=44\cdot 7;$ $y_8=(51-8)\cdot 8=43\cdot 8;$ $y_9=(50-1)\cdot 1=50\cdot 1.$ Using identity (8) we have:

$y_1=y_9, S''=x_1+x_9=50+1=51.$

So we have $S=S'+S''=49+51=100$, $X_4=x_2+x_3+x_1+x_9$.

Example for solving problem 4:

We have $X^{16}=\{2, 1, 6, 4, 3, 5, 3, 17, 43, 23, 38, 14, 20, 10, 36, 47\}$. We need to find $X_5=\{x_i+x_j+x_k+x_l+x_m=S=106\}$.

For this on the basis formulas (12) and (13) we have $S=S'+S''$, $S'=x_i+x_j$, $S''=x_k+x_l+x_m$, $S'=6$, $S''=100$, $S=106$. Then use results of example 1 and example 2, so we have $S'=x_1+x_4=6$, $S''=x_9+x_{16}+x_{14}=43+47+10=100$ $S=S'+S''=6+100=106, X_5=x_1+x_4+x_9+x_{16}+x_{14}.$ This is a new method for solving NP-Complete problems with a much shorter time of their solution in comparison with all existing methods regardless of the size of the input data.

By the time of the present invention, mankind has been able to find solutions of NP problems, most of them iterating over the number of variants exponentially depending on the size of the input data. It should also be noted that NP problems include NP-complete problems and majority of NP problems can be reduced (in polynomial time) to the NP-complete problem. In this case, finding a polynomial solution for any NP-complete problem would mean the possibility of constructing a polynomial operation for majority of NP problems. Prior to the present invention, mankind could not find a satisfactory solution for any of the NP-complete problems, so before the present invention there was a hypothesis that this solution could not be found at all.

Herein the present invention we give subset sum problem as an example of NP problems as well as the methods of solutions:

Task1. Given "n" numbers and the number "s". It is required to find out whether there exists a subset of "m" numbers whose sum of elements is equal to "S".

Task2. There is a table 2×n given number "S". It is necessary to find 2 numbers from different lines giving in the sum "S".

Computing Operation 1. Full bust. Operating time—O($n^2$).

Computing Operation 2. Bust with sorting. Sort the first line, for each element from the second line, subtract it from S and look for this difference in the first line.

Task3. There is a table 3×n a given number "S". It is necessary to find 3 numbers from different lines giving in the sum "S".

Example. Given: 17 43 23 38 14 20 36 47. Is there a subset with a sum of 100?

Computing Operation 1. Full bust. Operating time—O($n^3$).

Computing Operation 2. For a single line, find all the differences with s, for the other two, sort through all the options. Operating time—O($n^2$).

Computing Operation 3. Task3 can be applied to a vector model.

Task4. There is a table 4×n a given number "S". It is necessary to find 4 numbers from different lines giving in the sum "S".

Example. Given: 50 2 47 5 21 4 78 1. Is there a subset with a sum of 100?

Computing Operation 1. There is a Schroeppel-Shamir operation with an operating time O($n^2 \log n$), requirement on memory O(n).

Task5. The coordinates of n points on the plane are given. It is required to determine whether any three of them lie on one line.

Computing Operation 1. The computing operation is implemented on the basis of a polynomial of the third degree.

The areas of practical application of solutions of NP problems (including but not limited to the examples given): information retrieval, encryption, banking transactions (including various payment card systems) and other areas of human activity.

It should also be noted that the hardware requirements for computers used in the areas of practical application of solutions of NP problems also directly depend on the computing operations used for solving NP problems and corresponding to these computing operations solution time. Suppose that for some NP problem a computing operation solves it for O($n^2$) actions. Then doubling of hardware performance of the computer will increase the size of the solvable problems by about one. If instead it is possible to find a computing operation that solves same NP problem for O($1.41^n$) actions, it would give doubling the parameters of the problems that could be solved. It can be seen that the present invention will significantly reduce the hardware requirements for computers used in the areas of practical application of solutions of NP problems.

The present invention, a new computing operation for solving NP problems with a much shorter time of their solution in comparison with all existing computing operations will significantly accelerate the performance of all methods, computer software products and computer systems used in the practical application of solutions of NP problems, as well as significantly reduce the hardware requirements.

FIG. 3 describes an exemplary method according to some embodiments of the disclosure. Any of the methods described herein may be executed in any order. One or more of the method steps may be optional. The method comprises receiving or accessing a first set of data elements 310; receiving or accessing a target computing operation result associated with at least two data elements of the first set 320; determining or generating a second set of mapped data elements mapped via one or more indices to the first set of data elements 330; utilizing a physical or virtual memory for storing the second set 340; determining equivalence between at least two mapped data elements of the second set 350; determining index information associated with the at least two mapped data elements of the second set 360; determining, based on the index information associated with the at least two mapped data elements of the second set, related index information associated with at least two data elements of the first set 370; determining, using the related index information associated with the at least two data elements of the first set, a first subset, of the first set, comprising the at least two data elements of the first set 380; deleting the second set from the physical or virtual memory, or overwriting, in the physical or virtual memory, the second set with data 390. In some embodiments, a first subset is not determined, and instead, just the two data elements of the first set are determined.

In the field of information retrieval systems, the first set may be unstructured data on the Internet, electronic library, network, etc. The subset may be a list of documents, media, or other information relevant to a query search. The number of keywords is related to the computing operation to be executed by the disclosure described herein. For example, for two keywords, the computing operation associated with determining a subset of two data set elements may be used.

In the field of banking systems, the first set may be any input information for authenticating to a financial institution account. The subset may be valid or approved authentication information (e.g., PIN code) associated with the financial institution account. The number of characters in the input information (e.g., PIN code) is related to the computing operation to be executed by the disclosure described herein. For example, for four keywords, the computing operation associated with determining a subset of four data set elements may be used.

In the field of image recognition, the first set may be image information associated with a population (or things). The subset may be image features associated with a target person (or thing). The number of image validation features (e.g., the distance between a person's nose and lips, or distance between various positions, etc.) is related to the computing operation to be executed by the disclosure described herein. For example, for five image validation features, the computing operation associated with determining a subset of five data set elements may be used.

In the field of medical diagnosis, the first set may be information (e.g., symptoms, etc.) associated with several health conditions, illnesses, diseases, etc. The symptoms (or other information) associated with a particular health condition (e.g., brain cancer) may be the subset. The number of symptoms is related to the computing operation to be executed by the disclosure described herein. For example, for three keywords, the computing operation associated with determining a subset of three data set elements may be used.

In the field of satellite configuration, the first set may be spatial coordinates or image information (e.g., image dimensions associated with altitudes, etc.) in space. The subset may be the desired or current spatial coordinates or image information (e.g., altitude information) of the satellite in space. The number of spatial coordinates (or image information) to determine or configure the position of the satellite is related to the computing operation to be executed by the disclosure described herein. For example, for three spatial coordinates, the computing operation associated with determining a subset of three data set elements may be used.

Let us introduce some basic definitions:

Definition1: We introduce an alphabet as a finite set of symbols $A=\{\tau, \alpha_1, \ldots, \alpha_k\}$, where $\tau$—space symbol, $|A|=k$, и $k>0$—number of alphabet symbols.

Definition2: A string/line of length "n", we will introduce as a sequence of symbols $T=\{t_1, \ldots, t_n, \$\}$, where $\forall i, t_i \in A$ and \$—special symbols, which do not belong to the alphabet and denotes the end of the string/line.

Definition3: A string/line "w" that does not contain the pace symbol $\tau$ is introduced as a word and we assume that the set of words "W" is always finite.

Definition4: Search template/pattern $P=\{p_1, \ldots, p_m\}$ we call a string/line consisting of a non-empty finite set of words separated by a space symbol $\tau$. In this particular case $|P|=m$—length of the template/pattern in symbols, $p_i \in W$, where "i"—number of the word in the template/pattern and "W"—set of words. Words in search templates/patterns and documents we call terms (or keywords).

Comment:

The length of the search template/pattern "P" will always be denoted by the symbol "m", and the total length of the original data T for which the search problem will be solved is denoted by "n".

P and NP Tasks:

The search tasks relate to the tasks P (polynomial) and NP (non-deterministic polynomial). Let's briefly consider these concepts:

The class P is defined quite simply—it is a set of such problems for which we know a computing operation that works in polynomial time. For simplicity, we can assume that the class P is a class of simple problems, since we know fast computing operations for solving them. Examples of tasks from class P: addition of two numbers, sorting of a set of n elements, searching for an element in a certain set, finding out the connectivity of a graph, and so on.

The NP class is defined as a problem for which we can only test some solution in polynomial time, but we do not know a computing operation that could solve the problem just as quickly. Examples of problems from the class NP: the subset sum problem, the problem of a backpack, the traveling salesman problem, the factorization of a number into prime factors, so on.

The Subset Sum Problem:

Task 1. Given "n" numbers and the number "s". It is required to find out whether there exists a subset of "m" numbers whose sum of elements is equal to "s".

Task 2. There is a table 2×n given number "s". It is necessary to find 2 numbers from different lines giving in the sum "s".

Computing Operation 1. Full bust. Operating time—$O(n^2)$.

Computing Operation 2 Bust with sorting. Sort the first line, for each element from the second line, subtract it from s and look for this difference in the first line.

Task 3. There is a table 3×n a given number "s". It is necessary to find 3 numbers from different lines giving in the sum "s".

Example. Given: 17 43 23 38 14 20 36 47. Is there a subset with a sum of 100?

Computing Operation 1. Full bust. Operating time—$O(n^3)$.

Computing Operation 2. For a single line, find all the differences with s, for the other two, sort through all the options. Operating time—$O(n^2)$.

Computing Operation 3. Task3 can be applied to a vector model.

Task 4. There is a table 4×n a given number "s". It is necessary to find 4 numbers from different lines giving in the sum "s".

Example. Given: 50 2 47 5 21 4 78 1. Is there a subset with a sum of 100?

Computing Operation 1. There is a Schroeppel-Shamir operation with an operating time—$O(n^2 \log n)$, requirement on memory—$O(n)$.

Task5. The coordinates of n points on the plane are given. It is required to determine whether any three of them lie on one line.

Computing Operation 1. The computing operation is implemented on the basis of a polynomial of the third degree.

Open Questions:

Given "n" numbers and the number "s". It is required to find out whether there exists a subset of three numbers whose sum of elements is equal to "s" and with the time of operation—$O(n^2)$.

Given "n" numbers and the number "s". It is required to find out whether there exists a subset of four numbers whose sum of elements is equal to "s" and with the time of operation—$O(n^3)$.

Are there other approaches to solving the subset sum problem with a better operating time than the above?

The seventh problem of the millennium: the equality of classes P=NP? The Klein Institute for the solution of this problem offers a reward of one million dollars.

Formulation of the subset sum problem:

It is given a set of natural numbers $(x_1, x_2, \ldots, x_n) \in X^n$ with 'n' dimension. We need to find out if there is a subset $X_m$ with 'm' dimension ($|X_m|=m$), where relations are fulfilled as follows: $X_m = \{x_i + x_j + \ldots + x_g + x_h = S; i \neq j \neq \ldots \neq g \neq h;$ $(x_i, x_j, \ldots, x_g, x_h) \in X^n$; $(i, j, \ldots, g, h) \in N = (1, 2, \ldots, n)$, amount of elements from $x_i$ to $x_h$, is equal to 'm', $m<N\}$ (1)

The subset $X_m \subseteq X^n$ is a collection of elements $(x_i, x_j, \ldots, x_g, x_h)$ with mismatched indices. The number or quantity of subsets $X_m$ may be one or several.

Let us now come to solving practical problems which are arised from the formulation of the subset sum problem (1).

Problem 1. We need to find out if there is subset:

$$X_2 = \{x_i + x_j = S; i \neq j; x_i, x_j \in X^n; i,j, \in N\} \quad (2)$$

Problem 2. We need to find out if there is subset:

$$X_3 = \{x_i + x_j + x_k = S; i \neq j \neq k; x_i, x_j, x_k \in X^n; i,j,k, \in N\} \quad (3)$$

Problem 3. We need to find out if there is subset:

$$X_4 = \{x_i + x_j + x_k + x_l = S; i \neq j \neq k \neq l; x_i, x_j, x_k, x_l \in X^n; i,j,k,l, \in N\} \quad (4)$$

Problem 4. We need to find out if there is subset:

$$X_5 = \{x_i + x_j + x_k + x_l + x_m = S; i \neq j \neq k \neq l \neq m; x_i, x_j, x_k, x_l, x_m \in X^n; i, j,k,l,m \in N\} \quad (5)$$

To solve the set problems let us introduce the mapping of the set $X^n$ in the set $Y^n$:

$$\tau(S,x) = (S-x)x, x \in X^n \quad (6)$$

Based on mapping (6) we have:

$$Y^n = \{y_1, y_2, \ldots, y_n | \tau(S,x_i) = y_i; x_i \in X^n; i=1,2,\ldots,n\} \quad (7)$$

Now we introduce the identity.

Let among the set $Y^n$ there are such elements which perform identity: $y_i = y_j$, $i \neq j$; $i, j \in N$ (8)

Then it is right that:

Lemma 1. Let there is identity (8) for the set (7). Then the problem 1 is solvable.

Proof (evidence): From the identity (8) we have:

$$y_i = \tau(S,x_i) = (S-x_i)x_i = x_j x_i, \text{supposing that } x_j = S - x_i$$

From the other hand $y_j = \tau(S, x_j) = (S - x_j)x_j = x_i x_j$, similarly supposing that $x_i = S - x_j$. In fact $x_i$ and $x_j$ are the roots of the quadratic equation $x^2 - Sx + C = 0$. According to Vieta theorem $C = x_i \cdot x_j$. Then we have $y_i = y_j = x_i \cdot x_j$. Which means fulfillment of the identity (8). Then there are elements $x_i$ and $x_j$ that fulfil $x_i + x_j = S$. Q.E.D.

Let us now solve the problem 2.

Let us enter value $S(x_k) = S - x_k, x_k \in X^n$ (9)

Lemma 2. Let for some elements $x_k \in X^n$ and taking into account formula (9) identity (8) is fulfilled for $k \neq i \neq j$; i, j, k $\in N$. Then the problem 2 is solvable.

Proof (evidence). In fact from the identity (8) taking into account formula (9) we have:

$\tau(S(x_k), x_i) = (S(x_k) - x_i)x_i = x_j x_i$, supposing that $(S(x_k) - x_i) = x_j$. On the other hand $\tau(S(x_k), x_j) = (S(x_k) - x_j) \cdot x_j = x_i x_j$, similarly supposing that $x_i = S(x_k) - x_j$. Which means that conditions of Lemma 1 are fulfilled with taking into account formula (9), i.e. we have $x_i + x_j + x_k = S'$. It is supposed that element $x_k$ is a non-repeating element (or in alternative embodiments, is a repeating element). Q.E.D.

To solve problem 3 let us make the following partition of S (partition of the value S'):

$$S' = x_i + x_j, S'' = x_k + x_l, x_i, x_j, x_k, x_l \in X^n;$$

$$i \neq j \neq k \neq l; i,j,k,l \in N. \quad (10)$$

$$S = S' + S'', S' \neq S''. \quad (11)$$

Then it is right that:

Lemma 3. Let for each of the value S' and S" defined by the formula (10) Lemma 1 is applicable if the relationship (11) is right. Then the problem 3 is solvable.

Proof (evidence). Formulas (10) and (11) allow to apply Lemma 1 and to parallelize solving problem 3 i.e. simultaneously solved problems for S' and S", and subsets $X_2'$, $X_2"$ are formed respectively. Combining these subsets $X_2 = X_2' \cup X_2"$ with mismatched indices is done on the basis of equality $S = S' + S"$. Q.E.D.

Let us now solve problem 4.

Similar to the solution of the problem 3 let us make following partition:

$$S'' = x_i + x_j, S'' = x_k + x_l + x_m; x_i, x_j, x_k, x_l, x_m \in X^n; i \neq j \neq k \neq l \neq m;$$

$$i,j,k,l,m \in N \quad (12)$$

$$S = S' + S'', S' \neq S'' \quad (13)$$

Lemma 4. Let for each of the value S' and S" defined by the formula (12) Lemma 1 and Lemma 2 are applicable if the relationship (13) is right. Then the problem 4 is solvable.

Proof (evidence). Lemma is based on Lemma 1 and Lemma 2 for the values of S' and S" respectively. And subsets $X_2'$ and $X_3"$ are formed. Combining these subsets $X_5 = X_2' \cup X_3"$ with mismatched indices is done on the basis of relationship (13). Q.E.D.

Computing operations for solving problem 1.

Operation 1. Input of the initial data: $X^n$, n, S.

Operation 2. Set $Y^n$ is formed on the basis of mapping (6).

Operation 3. Identity (8) verification and forming the subset $$X_2 = \{\tau(S,x_i) - \tau(S,x_j) = 0 | x_i, x_j \in X^n; i \neq j; i,j \in N\}$$

Operation 4. Output of the subset $X_2$.

Operation time is $T=O(n)$, memory requirements for forming the set $Y^n$ is $M=O(n)$. For comparison, operation time of the 2-table sum is $T=O(n \log n)$.

Note. Maximum quantity of pairs in the set $Y^n$ will be $m=[n/2]$. So the quantity of pairs in the set $Y^n$ may change from 1 to m. Also there is a need to highlight the fact that given computing operations for solving problem 1 with little modification will find all the subsets $X_2$.

Computing operations for solving problem 2.

Operation 1. Input of the initial data: set $X^n$, n, S.

Operation 2. Calculation of $S(x_k) = S - x_k$, $x_k \in X^n$ on the basis of formula (9).

Operation 3. Identify (8) verification and forming the subset $$X_3=\{\tau(S(x_k),x_i)-\tau(S(x_k),x_j)=0|x_i,x_j,x_k\in X^n; i\neq j,\neq k; i,j,k\in N\}.$$

Operation 4. Output of the subset $X_3$.

According to the Note above operation time for computing operations for solving problem 2 is $T=O((n-2m)\cdot 2m)$, where 'm'—quantity of subsets $X_2$, 'n−2m'—quantity of indices left to choose index 'k' for the element '$x_k$'. Memory requirement $M=O(n)$. For comparison, operation time of the 3-table sum is $T=O(n^2)$.

Computing operations for solving problem 3.
Operation 1. Input of the initial data: $X^n$, n, S.
Operation 2. Partition of $S=S'+S''$ on the basis formula (10).
Operation 3. Forming of the subset $X_2'$ for the S':

$$X_2'=\{\tau(S',x_i)-\tau(S',x_j)=0|x_i,x_j\in X^n; i\neq j; i,j,\in N\}$$

Operation 4. Forming of the subset $X_2''$ for the S'':

$$X_2''=\{\tau(S'',x_k)-\tau(S'',x_l)=0|x_k,x_l\in X^n; k\neq l; k,l\in N\}$$

Operation 5: Forming of the subset $X_4$:
$X_4=\{X_2' \cup X_2''\}$—combining $X_2'$ and $X_2''$ subsets with mismatched indices on the basis of formula (11).
Operation 6. Output of the subset $X_4$.

Operation time is $T=2*O(n)$, memory requirement $M=2*O(n)$. For comparison, operation time of the 4-table sum is $T=O(n^2 \log n)$. In case if given computing operations for solving problem 3 are parallelized, then operation time would be $T=O(n)$.

Computing operations for solving problem 4.
Operation 1. Input of the initial data: set $X^n$, n, S.
Operation 2. Partition of S on S' and S'' on the basis of formulas (12) and (13).
Operation 3. Forming of the subset $X_2'$ for S' on the basis of computing operations for solving problem 1:

$$X_2'=\{\tau(S',x_i)-\tau(S',x_j)=0|x_i,x_j\in X^n; i\neq j; i,j\in N\}$$

Operation 4. Forming of the subset $X_3''$ for S'' on the basis of computing operations for solving problem 2:

$$X_3''=\{\tau(S''(x_k),x_l)-\tau(S''(x_k),x_m)=0|x_k,x_l,x_m\in X^n; k\neq l\neq m; k,l,m\in N\}$$

Operation 5. Forming of the subset $X_5=\{X_2' \cup X_3''\}$—combining of $X_2'$ and $X_3''$ subsets with mismatched indices on the basis of formula (13).
Operation 6. Output of the subset $X_5$.

Operation time is $T=O(n)+O((n-2m)\cdot 2m)$, memory requirement is $M=2*O(n)$.

Conclusions
1. Computing operations to output further subsets $X_6$, $X_7$, $X_8$, . . . , $X_m$ are determined on the basis of given computing operations for solving problems 1-4.
2. Also we need to note that given computing operations for solving problems 1-4 may be improved by Hoare's method, Lomuto's method and other sorting methods. At the same time it should be mentioned that these sorting methods do not include exact way to determine pivot element. But when these sorting methods are used within given computing operations for solving problems 1-4, pivot element is easily determined which makes sorting more effective. Pivot element is determined on the condition of formula (function) (6) maximum.

Pivot element to be determined by the formula $x^*=S/2$ with the maximum value $y^*=S^2/4$.

In particular, computing operations for solving problem 1 with sorting (for ex., using Hoare's method) will improve operation time to:

$$T=O(n)+O((n-m)\log(n-m)), \text{ where}$$

$O(n)$—time needed for partition of the set $X^n$ to two subsets $X'(|X'|=m)$, $X''(|X''|=n-m)$ related to the pivot element $x^*$. If $n-m>m$, then sorting time for the subset $X''$ will be $T=O((n-m)\log(n-m))$, wherein subset $X'$ is sorted simultaneously with subset $X''$.

Comparison to 2, 3, 4—table sum operation time shows high effectiveness of new given computing operation for solving problems 1-4 together with less requirements on memory, hardware and other computing systems.

Practical application of given computing operation for solving problems 1-4:
1. information search;
2. security of banking systems;
3. encryption of information;
4. information coding;
5. cryptosystems and so on.

Example for solving problem 1:
We have set of numbers $X^7=\{x_1, x_2, x_3, x_4, x_5, x_6, x_7\}=\{2, 1, 6, 4, 3, 5, 3\}$. Dimension of the set n=7.
Problem we need to find out if this set includes subset $X_2$ with dimension m=2:

$$X_2=\{x_i+x_j=S=6; i\neq j; x_i,x_j\in X^7; i,j,\in N=(1,2,3,4,5,6,7)\}$$

So, in terms of operation 1 we have initial data:

$$X^7=\{2,1,6,4,3,5,3\}; n=7; S=6.$$

Operation 2 is to transform set of $X^7$ on the basis of formula (6)
$\tau(S, x)=(S-x)x$. As the result we have:

$$Y^7=\{8,5,0,8,9,5,9\}=\{y_1,y_2,y_3,y_4,y_5,y_6,y_7\}$$

Operation 3 is to find identity (8): $y_i=y_j$, i, j, $\in N$
and on this basis find subset $X_2$:

$$y_1=y_4, S=x_1+x_4=2+4=6; X_2=\{x_1,x_4\}$$

$$y_2=y_6, S=x_2+x_6=1+5=6; X_2=\{x_2,x_6\}$$

$$y_5=y_7, S=x_5+x_7=3+3=6; X_2=\{x_5,x_7\}.$$

These are output of subset $X_2$ which is operation 4.
Example for solving problem 2:
We have set of numbers $X^9=\{x_1, x_2, x_3, x_4, x_5, x_6, x_7, x_8, x_9\}=\{17, 43, 23, 38, 14, 20, 10, 36, 47\}$ Dimension of the set n=9.
We need to find out if this set includes subset $X_3$ with dimension m=3:

$$X_3=\{x_i+x_j+x_k=S=100; i\neq j\neq k; x_i,x_j,x_k\in X^9; i,j,k\in N=(1,2,3,4,5,6,7,8,9)\}.$$

First we choose any arbitrary element, for ex: $x_7=10$. Then we calculate $S(x_k)$ on the basis of formula (9).

$$S(x_k)=S(x_7)=S-x_7=100-10=90.$$

Then we use transformation based on formula (6)

$$X_3=\{\tau(S(x_k),x_i)-\tau(S(x_k),x_j)=0|x_i,x_j,x_k\in X^n; i\neq j,\neq k; i,j, k\in N:$$

$$y_1=(90-17)\cdot 17=73\cdot 17;$$

$$y_2=(90-43)\cdot 43=47\cdot 43;$$

$$y_3=(90-23)\cdot 23=67\cdot 23;$$

$$y_4=(90-38)\cdot 38=52\cdot 38;$$

$$y_5=(90-14)\cdot 14=76\cdot 14;$$

$$y_6=(90-20)\cdot 20=70\cdot 20;$$

$y_7=(90-10)\cdot 10=80\cdot 10;$ $y_8=(90-36)\cdot 36=54\cdot 36;$ $y_9=(90-47)\cdot 47=43\cdot 47$ Then we verify identity (8) or we have $y_2=y_9$, $S=x_2+x_9+x_7=43+47+10=100$ Subset $X_3=\{x_2, x_9, x_7\}$.

Example for solving problem 3:

We have set $X^9=\{50, 2, 47, 5, 21, 4, 7, 8, 1\}=\{x_1, x_2, x_3, x_4, x_5, x_6, x_7, x_8, x_9\}$. We need to find $x_i+x_j+x_k+x_l=S=100$. So, let's use formula (10) for partition $S=S'+S''=49+51=100$. Then for $S'=49$ we have:

$y_1=(49-50)\cdot 50=-1\cdot 50;$ $y_2=(49-2)\cdot 2=47\cdot 2;$ $y_3=(49-47)\cdot 47=2\cdot 47;$ $y_4=(49-5)\cdot 5=44\cdot 5;$ $y_5=(49-21)\cdot 21=28\cdot 21;$ $y_6=(49-4)\cdot 4=45\cdot 4;$ $y_7=(49-7)\cdot 7=42\cdot 7;$ $y_8=(49-8)\cdot 8=41\cdot 8;$ $y_9=(49-1)\cdot 1=48\cdot 1$ Using identity (8) we have $y_2=y_3$, $S'=x_2+x_3=2+47=49$. Similarly we do calculations for $S''=51$:

$y_1=(51-50)\cdot 50=1\cdot 50;$ $y_2=(51-2)\cdot 2=49\cdot 2;$ $y_3=(51-47)\cdot 47=4\cdot 47;$ $y_4=(51-5)\cdot 5=46\cdot 5;$ $y_5=(51-21)\cdot 21=30\cdot 21;$ $y_6=(51-4)\cdot 4=47\cdot 4;$ $y_7=(51-7)\cdot 7=44\cdot 7;$ $y_8=(51-8)\cdot 8=43\cdot 8;$ $y_9=(50-1)\cdot 1=50\cdot 1.$ Using identity (8) we have:

$y_1=y_9, S''=x_1+x_9=50+1=51.$

So we have $S=S'+S''=49+51=100$, $X_4=x_2+x_3+x_1+x_9$.

Example for solving problem 4:

We have $X^{16}=\{2, 1, 6, 4, 3, 5, 3, 17, 43, 23, 38, 14, 20, 10, 36, 47\}$. We need to find $X_5=\{x_i+x_j+x_k+x_l+x_m=S=106\}$.

For this on the basis formulas (12) and (13) we have $S=S'+S''$, $S'=x_i+x_j$, $S''=x_k+x_l+x_m$, $S'=6$, $S''=100$, $S=106$. Then use results of example 1 and example 2, so we have $S'=x_1+x_4=6$, $S''=x_9+x_{16}+x_{14}=43+47+10=100$ $S=S'+S''=6+100=106, X_5=x_1+x_4+x_9+x_{16}+x_{14}.$ This is a new method for solving NP-Complete problems with a much shorter time of their solution in comparison with all existing methods regardless of the size of the input data.

By the time of the present invention, mankind has been able to find solutions of NP problems, most of them iterating over the number of variants exponentially depending on the size of the input data. It should also be noted that NP problems include NP-complete problems and majority of NP problems can be reduced (in polynomial time) to the NP-complete problem. In this case, finding a polynomial solution for any NP-complete problem would mean the possibility of constructing a polynomial operation for majority of NP problems. Prior to the present invention, mankind could not find a satisfactory solution for any of the NP-complete problems, so before the present invention there was a hypothesis that this solution could not be found at all.

Herein the present invention we give subset sum problem as an example of NP problems as well as the methods of solutions:

Task1. Given "n" numbers and the number "s". It is required to find out whether there exists a subset of "m" numbers whose sum of elements is equal to "S".

Task2. There is a table 2×n given number "S". It is necessary to find 2 numbers from different lines giving in the sum "S".

Computing Operation 1. Full bust. Operating time—O($n^2$).

Computing Operation 2. Bust with sorting. Sort the first line, for each element from the second line, subtract it from S and look for this difference in the first line.

Task3. There is a table 3×n a given number "S". It is necessary to find 3 numbers from different lines giving in the sum "S".

Example. Given: 17 43 23 38 14 20 36 47. Is there a subset with a sum of 100?

Computing Operation 1. Full bust. Operating time—O($n^3$).

Computing Operation 2. For a single line, find all the differences with s, for the other two, sort through all the options. Operating time—O($n^2$).

Computing Operation 3. Task3 can be applied to a vector model.

Task4. There is a table 4×n a given number "S". It is necessary to find 4 numbers from different lines giving in the sum "S".

Example. Given: 50 2 47 5 21 4 78 1. Is there a subset with a sum of 100?

Computing Operation 1. There is a Schroeppel-Shamir operation with an operating time O($n^2$ log n), requirement on memory O(n).

Task5. The coordinates of n points on the plane are given. It is required to determine whether any three of them lie on one line.

Additional Embodiments

The novelty of the proposed operations lie in the formation of an intermediate data set using a combination function, in conjunction with operations previously disclosed in the section preceding the "Additional Embodiments" section.

The most important task of theoretical informatics is the equality of classes P and NP. This task was formulated in 1971 and still remains unresolved. A prize of one million US dollars has been awarded for proving the statement P=NP or for proving its refutation. If, nevertheless, it turns out that P=NP, then this will make it possible to quickly and efficiently solve many currently unsolvable problems. So what is the essence of the problem? Class P (Polynomial time) includes simple tasks that can be solved in polynomial time. An example of a simple search task is the sorting of an array of arbitrary data, which is necessary to quickly find certain data. Depending on the selected sorting operations, for an array of length n, the number of operations performed will be from n log n to $n^2$. Thus, the simplicity of the operations belonging to the class P lies in the fact that as n increases, the execution time increases slightly. The class NP (Non-deterministic Polynomial time) includes tasks for which the verification of already found solutions can be carried out in polynomial time. The complexity of the problems of this class lies in the fact that directly finding a solution requires significantly more than polynomial time.

The first fundamental reviews of information retrieval problems stated existing open problems in area of search engines. Currently, there are important practical and theoretical problems: theory of operations, the search problem, the satisfiability problem, the decision problem, encipherment problem and others. These include the knapsack problem, the traveling salesman problem, and many others. The indicated problems belong to the class of NP-complete problems. NP-complete problems are solved on the basis of exponential and polynomial operations. One of the key places is occupied by the analysis of their operating time and the memory used by them. In formalization, many of these problems are reduced to the problem of the sum of a subset of a given set (subset sum problem).

The task of finding an m-dimensional subset of an n-dimensional set (m≤n) whose sum of elements is equal to some given number S is NP-complete. The computational complexity of this task depends on two parameters—the number of n elements of the original set and the accuracy p (defined as the number of binary bits in the numbers that make up the set). Fundamental mathematics has long established the fact that the number of subsets of a set consisting of n elements is $2^n$.

In some solutions, the operating time of the operations and the consumed memory are determined in the form of an exponential function of the parameter n. Schreppel and Shamir made a significant contribution to the development of search methods based on tabular m-sums. As a practical problem, the knapsack problem is considered. It is shown that the problem is most difficult when n is of high order. The task becomes easy only with very small values of the parameters n and p. If n (the amount of input data) is small, then exhaustive search is quite acceptable. If the parameter p (the number of bits in the numbers of the set) is small, you can use dynamic programming to solve the knapsack problem. It is easy to make sure that the solution is checked quickly (you just need to sum the elements of the found subset). But exponential time must be spent on finding a solution, since it is necessary to check all possible subsets. This makes the solution of the problem posed impractical for large values of n.

Open Problems of NP-Complete Problems

Many works are devoted to the development of exponential operations for solving the subset sum problem, in which the operation time $T=O(2^{n/2})$ and the required memory $M=O(2^{n/4})$ depend on n and do not allow the obtained practical results for large n. The main disadvantage of the known tabular methods (sums) is the construction of each row of the table according to the property defined by each keyword. This means that we are obliged to carry out preliminary work on some structuring of the input data. In turn, when using the vector data model, an additional problem arises of dividing the vector space into subspaces according to each keyword.

Let us consider one of the statements of NP-complete problems.

Theoretical problem (subset sum problem). Given a set of n natural numbers and a number S. It is required to find out if there is one or more subsets, each of which consists of m elements (m≤n), and the sum of these elements is S.

It is important to note that the solution of the problem will provide the solution of numerous problems from NP-complete problems.

Now we can move on to the mathematical formulation of the problem of the sum of the subsets and its solution.

The main problem. Given a set of integer (natural) numbers $(x_1, x_2, \ldots, x_n) \in X^n$ of dimension n. It is required to find out if there exists a subset $X_m$ of dimension m such that the conditions are satisfied:

$$X_m = \{x_i + x_j + \ldots + x_g + x_h = S, i \neq j \neq \ldots \neq g \neq h, x_i, x_j, \ldots, x_g, x_h \in X^n, (i,j,\ldots,g,h) \in N = (1,2,\ldots,n), m \leq n\} \quad (14)$$

Here $x_i, x_j, \ldots, x_g, x_h \in X_m$, with the number of elements $x_i, x_j, \ldots, x_g, x_h$ equal to m.

We introduce the following notation: $C_n^m$-combination, $S_n^m$-sum of elements of one subset from the set of subsets $X_m$ of the set $X^n$. Moreover, the variable m can vary from 0, 1, 2, ..., n. The set of these subsets $X_m$ is determined based on the combination $$C_n^m = \frac{n!}{m!(n-m)!}. \quad (15)$$

Sort the set $X^n$ in increasing order and find the quantities $$S_{min}^m = \Sigma_1^m x_i, \quad (16)$$

$$S_{max}^m = \Sigma_{n-m+1}^n x_i. \quad (17)$$

We compose possible ranges of membership of the certificate S, the corresponding subset of the set of subsets $X_m$, $$S \in [S_{min}^m, S_{max}^m]. \quad (18)$$

Methods for Solving the Problem of the Sum of Subsets

The solution to the problem of the sum of subsets is based on previously disclosed embodiments and the following statements.

Statement 1. Let the certificate S belong to the range $[S_{min}^m, S_{max}^m]$. Then there exists a subset $X_m$ whose sum of elements is S.

Proof. Fulfillment of the hypothesis of the statement 1 (or condition (19)) means that it is necessary to generate all subsets of $X_m$ based on the formula (15) of the $X^n$, the sum of the elements of each of them varies from the minimum value $S_{min}^m$ to the maximum value $S_{max}^m$. This is equivalent to generating all n-dimensional binary vectors from zeros and ones (e $\in E^n$). The above condition allows you to enumerate the subsets in the order of the minimum change of the binary code of the binary vector e. If the i-th index of the vector e is 1 (one), this means that this element is included in this subset and should be taken into account when calculating the sum of the elements. The definition of m indices on which units stand uniquely determines the vector e corresponding to one subset of the set of subsets $X_m$. If there is a certificate S from the specified range, then there is a binary vector e such that the sum S is calculated on the basis of the scalar product: S=(e, x).

We extend the result to a set of subsets $X_{n-m}$ from the set $X^n$ for the range $[S_{min}^{n-m}, S_{max}^{n-m}]$.

Statement 2. Let the certificate S belong to the range $[S_{min}^{n-m}, S_{max}^{n-m}]$. Then there exists a subset $X_{n-m}$ whose sum of elements is S.

Evidence. Based on the equality of combinations $C_n^m = C_n^{n-m}$ we can replace the variable m with the variable n−m and the binary vector e with the binary vector $\bar{e}$ from statement 1, in which the zeros of the vector e are replaced by ones and the ones by zeros. Then there exists a binary vector $\bar{e}$ such that the certificate S is calculated on the basis of the scalar product: $S=(\bar{e}, x)$ or $S=S_{min}^n-(e, x)$.

Remark 1. 1.) If there is an element $x \in X^n$ such that the difference $S-x$ is representable as the sum of $m-1$ elements from the set $X^n$, then there exists a subset $X_{m-1}$. 2.) It is assumed that in statement 1, the certificate S can vary from $S_{min}^m$ to $S_{max}^m$. 3.) The dimension of the subset $X_m$ easily extends to n if other elements of this subset are considered zeros, except for elements with indices (i, j, . . . , g, h)$\in$N. 4.) The indicated indices are generated based on the combination generation function. 5.) In the case of a given m, there is no need to use Statements 1 and 2.

The statements and symmetry of the combination function (15) determine the maximum value of the parameter $m=n/2$.

It is easy to find the running time of operations based on statement 1, $T=O(C_n^m)$. (19)

The required memory $M=O(n)$ is required to store the feasible binary vector e. The indices of nonzero components of this vector are determined based on the combination generation function.

A new approach is proposed for solving the problem of the sum of subsets, based on previously disclosed embodiments.

Case 1. The variable m can take even values of 4, 6, 8, 10 or more. In previously disclosed embodiments, the cases $m=2$ and $m=3$ were considered in detail. Then the variable k is determined by the formula:

$$k=m/2. \qquad (20)$$

We construct a subset $Z^l=\{z_1, z_2, \ldots, z_l\}$, consisting of the sum of elements $x_i$ with indices determined on the basis of the function for generating the combination $C_n^k$, from the set $X^n$, $l=C_n^k$.

In particular, if $X^7=\{x_1, x_2, x_3, x_4, x_5, x_6, x_7\}$, $n=7$, $k=3$, $l=35$. Then the subset $Z^{35}=\{z_1, z_2, \ldots, z_{35}\}$ consists of elements $z_1=x_1+x_2+x_3$, $z_2=x_1+x_2+x_4$, $z_3=x_1+x_2+x_5$, . . . , $z_{34}=x_4+x_6+x_7$, $z_{35}=x_5+x_6+x_7$. Each element is the sum of three elements with indices determined based on the function for generating the combination $C_7^3$, from the set $X^7$.

We introduce the mapping of the subset $Z^l$ into the set $Y^l$:

$$y=\tau(S,z)=(S-z)z, \forall z \in Z^l. \qquad (21)$$

Based on the mapping (21), we obtain:

$$Y^l=\{y_1, y_2, \ldots y_l \leftrightarrow \tau(S,z_i)=y_i, z_i \in Z^l, i=1,2,\ldots,l\}. \qquad (22)$$

Let among the set $Y^l$ there exist elements such that the identity holds:

$$y_i=y_j, i \neq j; i,j \in L, L=\{1,2,\ldots,l\} \qquad (23)$$

Lemma 4. Let the certificate S belong to the range $[S_{min}^m, S_{max}^m]$ and identity (23) holds for the set (22). Then there is one or more subsets of $X_m$ and the main problem is solvable.

Proof. The first condition shows the existence of the subset $X_m$ from statement 1. The course of further arguments is completely based on the proof of Lemma 4 from previously disclosed embodiments. To construct a subset $X_m$ satisfying the certificate S, based on identity (23), we have $y_i=\tau(S, z_i)=(S-z_i)z_i=z_jz_i$, if $z_j=S-z_i$. Here, the quantities $z_i$, $z_j$ are the sum of k elements from the set $X^n$, whose indices are determined based on the combination generation function $C_n^k$. On the other hand, according to the map (21), $y_j=\tau(S, z_j)=(S-z_j)z_j=z_iz_j$, similarly assuming that $z_i=S-z_j$. In fact, the quantities $z_i$, $z_j$ are the roots of the quadratic equation $z^2-Sz+c=0$. According to the Vieta theorem, $c=z_iz_j$. Thus, we obtain $y_i=y_j=z_iz_j$. The latter means the fulfillment of identity (23). Then there exist elements $z_i$ and $z_j$ such that $z_i+z_j=S$, $X_m=X_k^i \cup X_k^j$. The subsets $X_k^i$, $X_k^j$ are formed on the basis of the quantities $z_i$, $z_j$ in which addition operations are excluded. The inequality $i \neq j$ from (23) ensures the union of these subsets with diverging indices.

It is easy to find the running time of operations based on lemma 4 time $T=O(l)$. The required memory $M=O(l)$ is needed to preserve the subset $Y^l$.

Remark 2. For $k=2,3,4$, there are subsets $X_4$, $X_6$, $X_8$ with parameters $m=4$, $m=6$, $m=8$, respectively. Thus, each element $z_i \in Z^l$ is a sum of k elements x with non-coincident indices from the set $X^n$ determined by the function for generating the combination $C_n^k$. Under condition (23), there exist elements $y_i$, $y_j$ from the subset $Y^l$ with indices i, j such that $i \neq j$ such that condition $X_k^i \cup X_k^j \neq \emptyset$ is fulfilled.

Model example 1. It is required to find out if there exists a subset $X_6$ consisting of six different elements of the set $X^7$, the sum of which is S. According to the lemma 4, the elements $y_i=y_j$ must exist. Since $k=3$, then each of the variables $y_i$, $y_j$ consists of three elements from the set $X^7$ with diverging indices. These indices are determined based on the combination generation function $C_7^3$. In particular, for this subset $Y^{35}$, the following coincidences are possible: $y_1=y_{34}$ or $y_2=y_{35}$ or $y_1=y_{35}$ or $y_2=y_{35}$ and other combinations. Let the first and penultimate conditions be satisfied, and also the second and last conditions. Then we have the subsets $X_6=\{x_1, x_2, x_3, x_4, x_6, x_7\}$, $X_6=\{x_1, x_2, x_4, x_5, x_6, x_7\}$.

Case 2. The variable m takes odd values: 5,7,9,11 and further. Then the variable k is determined by the formula $k=(m-1)/2$.

We introduce the quantity:

$$S(x_l)=S-x_l, \forall x_l \in X^n, l \in N \qquad (24)$$

Lemma 5. Let the certificate S belong to the range $[S_{min}^m, S_{max}^m]$ and for some element $x_l \in X^n$ and taking into account formula (24) identity (23) holds. Then there is one or more subsets of $X_m$ and the main problem is solvable.

Evidence. The first condition shows the existence of the subset $X_m$ from statement 1. To construct a subset $X_m$ satisfying the certificate S, based on identity (23), taking into account formula (24), we have $\tau(S(x_l), z_i)=(S(x_l)-z_i)z_i=z_jz_i$, if $S(x_l)-z_i=z_j$. On the other hand, $\tau(S(x_l), z_j)=(S(x_l)-z_j)z_j=z_iz_j$, similarly assuming that $S(x_l)-z_j=z_i$. The latter means that the conditions of lemma 4 are satisfied. Then we have that $z_i+z_j+x_l=S$. Here $k=(m-1)/2$, $X_m=X_k^i \cup X_k^j \cup x_l$. The subsets $X_k^i$, $X_k^j$ are formed on the basis of the quantities $z_i$, $z_j$ in which addition operations are excluded.

Remark 3. The combination is determined by the formula $C_{n-1}^k$, $l=C_{n-1}^k$. Moreover, the element $x_l$ is excluded from the set $X^n$ and the set $X^{n-1}$ is considered.

The running time of operations based on lemma 5 is determined by the formula $T=O(nl)$ according to remark 3. The required memory $M=M=O(l)$ is needed to preserve the subset $Y^l$.

Model example 2. It is required to find out if there exists a subset $X_5$ consisting of five different elements of the set $X^7$, the sum of which is S. According to lemma 5, there must exist elements $y_i=y_j$. Since $k=2$ and $x_l=x_7$, $l=C_6^2$, $Y=\{y_1, y_2, \ldots, y_{14}, y_{15}\}$. Then each of the variables $y_i$, $y_j$ consists of two elements from the set $X^6$ with diverging indices. These indices are determined based on the combination generation function $C_7^2$: (1,2), . . . , (1,6), (2,3), . . . , (2,6), . . . , (5,6). In particular, for this subset $Y^{15}$, the following coincidences are possible: $y_1=y_{14}$ or $y_2=y_{15}$ or $y_1=y_{15}$ or $y_2=y_{15}$ and other combinations. Let the first and penultimate conditions be satisfied, and also the second and last conditions. Then we have the subsets $X_5=\{x_1, x_2, x_4, x_6, x_7\}$, $X_6=\{x_1, x_3, x_5, x_6, x_7\}$. If condition (23) is not fulfilled, another element $x_l$ is selected and this process is repeated until condition (23) is satisfied.

The running time (19) of possible operations built on statements 1 and 2, as the variable m approaches the value n/2 increases rapidly. Therefore, for large values of the parameter k, the dimension $l=C_n^k$ of the subset $Y^l$ increases and the selection of indices i, j becomes more complicated.

This proposition is illustrated by remark 2 and a numerical example 3. Then we use the partition of the set $X^n$ into $\bar{n}$ disjoint subsets $X^{m_1}, X^{m_2}, \ldots, X^{m_{\bar{n}}}$ with respect to indices whose dimensions satisfy the conditions $m_1+m_2+\ldots+m_{\bar{n}}=n$, $$m_i \gg k = \left[\frac{m}{2}\right], i = 1, 2, 3, \ldots, \bar{n}.$$

Thus, to each subset $X^{m_i}$ lemmas 4 or 5 are applicable.

Let the quantities $k_1$, $k_2$ depend on the parameter m, with $m=k_1+k_2$. It is assumed $k_1=k_2$. It is believed that for each subset $X^{m_i}$ the original problem is solved.

Lemma 6. If there are two subsets $X_{k_1}^i \in X^{m_i}$ and $X_{k_2}^j \in X^{m_j}$, selected from the subsets $X^{m_1}, X^{m_2}, \ldots, X^{m_{\bar{n}}}$ based on the combination $C_{\bar{n}}^2$ and satisfying the main conditions of lemma 4 and such that $X_m = X_{k_1}^i \cup X_{k_2}^j$ and the indices of the elements of these subsets $X_{k_1}^i, X_{k_2}^j$ are determined based on the generation functions for the combinations $C_{m_i}^{k_1}$ and $C_{m_j}^{k_2}$ respectively. Then there are one or more subsets of $X_m$ and the main problem is solvable.

Evidence. Initially, we decompose the original set $X^n$ on the subsets $X^{m_i}$. Next, we make a sampling using lemma 4 of the subset $X_{k_1}^i$, whose elements belong to the subset $X^{m_i}$. We carry out similar actions for the subset $X_{k_2}^j$ from the subset $X^{m_j}$. Then the subset $X_m = X_{k_1}^i \cup X_{k_2}^j \neq \emptyset$, the sum of the elements of which is equal to the certificate S and at the same time $X_{k_1}^i \cap X_{k_2}^j = \emptyset$ due to the conditions for partitioning the set $X^n$.

Remark 4. 1.) If $X_m = X_{k_1}^i \cup X_{k_2}^j = \emptyset$, then other combinations based on the combination $C_{\bar{n}}^2$ are considered. If $k_1 \neq k_2$, the subsets $X_{k_2}^i, X_{k_1}^j$ are additionally defined for the possible construction of another subset $X_m = X_{k_2}^i \cup X_{k_1}^j$.

Remark 5. The conditions of the lemma 6 are true when combining a larger number of subsets, for example, $X_m = X_{k_1}^i \cup X_{k_2}^j \cup X_{k_3}^k$, $m = k_1 + k_2 + k_3$, the selection of three subsets of the subsets $X^{m_1}, X^{m_2}, \ldots, X^{m_{\bar{n}}}$ is carried out on the combination $C_{\bar{n}}^3$ and so on. The number of samples depends on the parameter m of the subset $X_m$.

The operating time of the operations based on lemma 6 is determined by the formula $O(C_{m_j}^k) \leq T \leq O(C_{m_i}^{k_1} * C_{m_j}^{k_2})$, if $m_i < m_j$. The required memory is $M = O(C_{m_i}^{k_1} + C_{m_j}^{k_2})$.

Discussion of the Results

In the scientific literature, there are a lot of methods for solving the problem of the sum of the subsets based on exponential operations. The search time and the required memory are $O(2^{n/2})$ and $O(2^{n/4})$, respectively. The main drawback of these methods is that the required time and used memory for information processing is expressed through the exponent, namely, the time multiplied by the memory $T*M=O(2^n)$ (n is the amount of processed data). The last remark imposes very strict requirements on the hardware and other means of information processing. Let us determine the applicability limit of the methods. Set n=128. To sort a subset of $2^{64}$ elements, it takes $O(2^{70})$ time. It is known that modern computers and information technologies can work with the data $2^{66}$. Thus, even a subset sorting is difficult.

Initially, new basic methods were developed for problems on the sum of the subset $X_m$ with dimensions 4, 5, 6 and more from the set $X^n$ (m=4, m=5, m=6 or more) belonging to the set $X^n$, with the above advantage in time $T=O(C_n^k)$ and memory $$M = O(C_n^k)\left(k = k_1 = k_2 = \left[\frac{m}{2}\right]\right).$$

This advantage is determined by the ratio $$\frac{C_n^m}{C_n^k}.$$

For comparison, we give the operation time of the subset $X_m$ by exhaustive search, which is equal to $T=O(n^m)$. The found time is much shorter than the search time for the exhaustive search in $C_n^m/C_n^k$ time (or so many times $n^{m-k}$).

The partitioning of the original set $X^n$ into subsets proposed as $m \to n/2$ (up to but not more than n/2) allows us to solve the problem of the sum of the subset $X_m$ with dimension eight or more belonging to the set $X^n$. Thus, new effective methods and operations for solving the problem of the sum of subsets in a network computing environment with optimization in time and memory were found. In particular, with m=1 and m=n-1, the traditional search methods follow from the theorems: sequential search and pattern matching (mask search).

We emphasize that in exponential operations for solving the problem of the sum of subsets, sorting methods are mandatory, which ensure the operating time of the operations is $T=O(2^{n/2})$. Sorting itself takes a rather long time.

The developed statements and lemmas make it possible to construct a whole family of operations for solving the problem of the sum of subsets.

Conclusion

Methods for solving problems from the NP-complete class are used every day in a huge number of areas: when restoring partially damaged files, decomposing a number into simple factors, in cryptography, optimizing various routes and sizes of delivered goods, in logistics and so on. A much more effective solution to such problems could save serious money, as well as time, because with modern methods we cannot solve fast enough, and we have to be content with only approximate solutions. In addition, in modern medicine there is no shortage of complex computational problems, and moreover, fast operations would bring the analysis of various diseases to a whole new level, which would help save many more lives.

The results show that the proposed exact operations for solving the problem of the sum of the subsets significantly reduce the operating time of these methods, as well as reduce the hardware requirements for the power of computers, servers and other used computing devices. The developed mathematical theory for solving the problem of the sum of the subsets will solve many theoretical and practical problems.

In some embodiments of the current application, the subset sum problem may be solved using the following computing operations. The term "sum" can mean any type of logical operation, computing operation, Boolean operation, mathematical operation, statistical operation, engineering operation, database management operation, etc., associated with any field of application. Any reference to "computing operation" in this disclosure refers to one or more logical operations, computing operations, Boolean operations, mathematical operations, statistical operations, engineering operations, database management operations, etc., associated with any field of application.

Problem 5. Determining parameter m of subset $X_m$ based on statement 1.

Operation 1. Entering set $X^n$, n, S.
Operation 2. Sorting the set $X^n$.
Operation 3. The definition of the boundaries of $S_{min}^m$, $S_{max}^m$ range by formulae $S_{min}^m = \sum_1^m x_i$, $S_{max}^m = \sum_{n-m+1}^n x_i$.
Operation 4. Checking that belongs $S \in [S_{min}^m, S_{max}^m]$ to the range.
Operation 5. Output parameter m.

Problem 6. Formation of subset $X_m$ based on Lemma 4.
Operation 1. Entering the set $X^n$, n, S, m.
Operation 2. Determination of parameter k based on (20) and the quantity $l = C_n^k$ (combination $C_n^k$).
Operation 3. Construction of subset $Z^l = \{z_1, z_2, \ldots, z_l\}$, consisting of the sum of elements $x_i$ from the set $X^n$ with indices determined on the basis of the operation for generating the combination $C_n^k$.
Operation 4. Formation of subset $Y^l$ based on map $y_i = \tau(S, z_i) = (S - z_i)z_i$, $i = 1, 2, \ldots, l$.
Operation 5. Checking condition $y_i = y_j$ and determining the elements $y_i \in Y^l$, $y_j \in Y^l$.
Operation 6. Determination of elements $z_i \in Z^l$ and $z_j \in Z^l$ based on the elements $y_i$, $y_j$ and $z_i + z_j = S$.
Operation 7. The formation of subsets $X_k^i$, $X_k^j$ on the basis of the elements $z_i$, $z_j$ which are needed to form $X_m$.
Operation 8. The formation of the subset $X_m = X_k^i \cup X_k^j$ based on the inequality $i \neq j$, which provides a combination of these subsets with non-matching indices.
Operation 9. Deriving subsets $X_m$.

Problem 7. Formation of the subset $X_m$ based on Lemma 5.
Operation 1. Entering the set $X^n$, n, S, m.
Operation 2. Choosing an arbitrary element $x_{\bar{l}}$ from the set $X^n$ and determining the parameter $k = (m-1)/2$ and the quantity $l = C_{n-1}^k$ (combination $C_{n-1}^k$).
Operation 3. The construction of the subset $Z^l = \{z_1, z_2, \ldots, z_l\}$, consisting of the sum of the elements $x_i$ with indices determined on the basis of the operations for generating the combination $C_{n-1}^k$, from the set $X^{n-1}$, does not contain element $x_{\bar{l}}$, $l = C_{n-1}^k$.
Operation 4. Formation of the subset $Y^l$ on the basis of the map $y_i = \tau(S(x_{\bar{l}}), z_i) = (S(x_{\bar{l}}) - z_i)z_i$, $i = 1, 2, \ldots, l$ taking into account the formula $S(x_{\bar{l}}) = S - x_{\bar{l}}$, $\forall x_{\bar{l}} \in X^n$, $\bar{l} \in \mathbb{N}$.
Operation 5. Checking condition $y_i = y_j$ and determining the elements $y_i \in Y^l$, $y_j \in Y^l$.
Operation 6. Determination of the elements $z_i \in Z^l$ and $z_j \in Z^l$ based on the elements $y_i$, $y_j$ and $z_i + z_j + x_{\bar{l}} = S$.
Operation 7. The formation of the subsets $X_k^i$, $X_k^j$ on the basis of the elements $z_i$, $z_j$ in which addition operations are excluded.
Operation 8. The formation of the subset $X_m = X_k^i \cup X_k^j \cup x_{\bar{l}}$ based on the inequality $i \neq j$, which ensures the union of these subsets with mismatched indices.
Operation 9. Deriving subsets $X_m$.

Problem 8. Formation of subset $X_m$ based on Lemma 6.
Operation 1. Enter the set $X^n$, n, S, m, $k_1$, $k_2$.
Operation 2. Partitioning the set $X^n$ into disjoint subsets $X^{m_1}, X^{m_2}, \ldots, X^{m_{\bar{n}}}$.
Operation 3. A sample of two subsets $X^{m_i}$, $X^{m_j}$ based on the combination $C_{\bar{n}}^2$.

Operation 4. The formation of the subsets $X_{k_1}^i \in X^{m_i}$, $X_{k_2}^j \in X^{m_j}$ based on Lemma 4.
Operation 5. Formation of the subset $X_m = X_{k_1}^i \cup X_{k_2}^j$ and counting the sum of the elements from the subset $X_m$, equal to the certificate S and go to operation 6, otherwise go to operation 4 with the selection of other subsets $X^{m_i}$, $X^{m_j}$ from the subsets $X^{m_1}, X^{m_2}, \ldots, X^{m_{\bar{n}}}$, defined on the basis of the combination $C_{\bar{n}}^2$.
Operation 6. Deriving subsets $X_m$.

Problem 9. The formation of the subset $X_m$ based on Problem 6 and sorting.
Operation 1. Entering the set $X^n$, n, S, m.
Operation 2. Definition of the parameter $k = [m/2]$ and the quantity $l = C_n^k$ (combinations $C_n^k$).
Operation 3. Sort the set $X^n$ in ascending order.
Operation 4. The construction of the subset $Z^l = \{z_1, z_2, \ldots, z_l\}$ in ascending order, consisting of the sum of elements $x_i$ from the set $X^n$ with indices determined based on the combination generation function $C_n^k$ and the insertion method.
Operation 5. Formation of the subset $Y^l = \{y_1\ y_2\ \ldots\ y_l\}$ based on the map $y_i = \tau(S, z_i) = (S - z_i)z_i$, $i = 1, 2, \ldots, l$.
Operation 6. Determination of $y^* = S^2/4$ and the corresponding $y^*$ of index $i^*$ in the subset $Y^l$.
Operation 7. The symmetry condition for the map $\tau(S, z_i)$ splits the subset $Y^l = Y_1 \cup Y_2$ into two subsets $Y_1 = \{y_1\ y_2 \ldots y_{i^*}\}$ in increasing order, $Y_2 = \{y_{i^*+1}\ y_{i^*+2} \ldots y_l\}$ in descending order. Here it is necessary to take into account the belonging of the element $y^*$ to the subset $Y^l$ in order to refine the index $i^*$.
Operation 8. Checking the condition $y_i = y_j$ and determining the elements $y_i \in Y_1$, $y_j \in Y_2$. We look at the first subset $Y_1$ in descending order (starting from the largest element), and at the second subset $Y_2$ in descending order (starting from the largest element). Assign $i = i^* - 1$, $j = i^* + 1$. If $y_i > y_j$, then move to the next element $(y_{i-2})$ in the first subset, and if $y_i < y_j$, move to the next element to the next to the element $(y_{j+2})$ in the second subset. If $y_i = y_j$, the solution is found and the operations stop.
Operation 9. Determination of the elements $z_i \in Z^l$ and $z_j \in Z^j$ based on the elements $y_i$, $y_j$ and $z_i + z_j = S$.
Operation 10. The formation of the subsets $X_k^i$, $X_k^j$ on the basis of the elements $z_i$, $z_j$ which are used to form $X_m$.
Operation 11. The formation of the subset $X_m = X_k^i \cup X_k^j$ based on the inequality $i \neq j$, which provides a combination of these subsets with non-matching indices.
Operation 12. Deriving subsets $X_m$.

The running time of Problem 9 with sorting will be $T = O(l/2)$. The memory required to store subset $Y^l$ is $M = O(l)$. However, it becomes more complicated to work with indices of existing subsets.

The result can be applied to Problems 7 and 8 with minor modifications.

NUMERICAL EXAMPLE 1

Let the set $X^{16} = \{17, 2, 9, 3, 28, 1, 14, 20, 6, 10, 4, 26, 7, 47, 43, 5\}$ be given. It is required to find a subset of $X_4$ with certificate $S = 110$.

Initially, we use Lemma 4 and Problem 6 for the first certificate. According to statement 1, $S = 110 \in [10, 144]$ and $m = 4$. We rewrite the original set in the form $X^{16} = \{x_1, x_2, x_3, \ldots, x_{14}, x_{15}, x_{16}\}$. The main parameters are $n = 16$, $k = m/2 = 2$, $l = C_n^k = C_{16}^2 = 120$. We form the subset $Y^{120} = \{y_1, y_2, \ldots, y_{120}\}$, consisting of the elements $z_1 = x_1 + x_2$, $z_2 = x_1 + x_3$, $z_3 = x_1 + x_4, \ldots, z_{118} = x_{14} + x_{15}$, $z_{119} = x_{14} + x_{16}$, $z_{120} = x_{15} + x_{16}$. Each element is the sum of two elements with indices determined based on the combination generation function $C_{16}^2$ from the set $X^{16}$. Next, we find the subset $Y^{120}=\{y_1, y_2, \ldots, y_{120}\}$ based on the application of the mapping (21) to the subset $Z^{120}$. We check the condition $y_i=y_j$, which is satisfied at the indices i=3, j=118. Then $y_3=(S-z_3)z_3=(110-20)20=90*20$, $y_{118}=(S-z_{118})z_{118}=(110-90)90=20*90$. We form the subset $X_4=X_2^i \cup X_2^j$ on the basis of the subsets $X_2^i$, $X_2^j$, which correspond to the elements $z_3$, $z_{118}$ which are used to form $X_4$. The indices of these subsets are i=3, j=118. Thus, we have $X_4=\{x_1, x_4, x_{14}, x_{15}\}$ for the certificate S=110.

NUMERICAL EXAMPLE 2

Let the set $X^{16}=\{15, 2,23,29,5,1,14,20,6,10,4,27,3,46,44, 9\}$ be given. It is required to find a subset of $X_5$ with certificate S=119.

According to statement 1, $S=119 \in [16, 169]$ and m=5. As $x_7 \in X^n$, I=16, $S(x_7)=S-x_7=119-9=110$, $x_7=9$. Then we have the set $X^{15}=\{15, 2,23,29,5,1,14,20,6,10,4,27,3,46,44\}$, which can be rewritten in the form $X^{15}=\{x_1, x_2, x_3, \ldots, x_{13}, x_{14}, x_{15}\}$. The main parameters are equal to n=15, k=(m-1)/2=2, $l=C_n^k=C_{15}^2=75$. We find the subset $Z^{75}=\{z_1, z_2, \ldots, z_{75}\}$, consisting of the elements $z_1=x_1+x_2$, $z_2=x_1+x_3$, $z_3=x_1+x_4$, $z_4=x_1+x_5$, ..., $z_{73}=x_{12}+x_{15}$, $z_{74}=x_{13}+x_{15}$, $z_{75}=x_{14}+x_{15}$. Each element is the sum of two elements with indices determined based on the combination generation function $C_{15}^2$, from the set $X^{15}$. We find the subset $Y^{75}=\{y_1, y_2, \ldots, y_{75}\}$ based on the application of the mapping (21) to the subset $Z^{75}$. We check the condition $y_i=y_j$, which is satisfied with the indices i=4, j=75. Then $y_4=(S-z_4)z_4=(110-20)20=90*20$, $y_{75}=(S-z_{75})z_{75}=(110-90)90=20*90$. We form the subset $X_4=X_2^i \cup X_2^j$ on the basis of the subsets $X_2^i$, $X_2^j$, corresponding to the elements $z_4$ and $z_{75}$ which are used to form $X_5$. The indices of these subsets are i=4, j=75. The final answer: $X_5=X_2^i \cup X_2^j \cup x_7$, $X_5=\{x_1, x_4, x_{14}, x_{15}, x_{16}\}$, S=119.

NUMERICAL EXAMPLE 3

Let the set be given $X^{16}=\{17,2,3,23,19,1,14,20,6,10,4,25, 7,49,41,5\}$. It is required to find a subset of $X_6$ with certificate S=137.

According to statement 1, $S=137 \in [21, 177]$ and m=6. We use Lemma 5 and Problem 7 for this certificate. We rewrite the original set in the form $X^{16}=\{x_1, x_2, x_3, \ldots, x_{14}, x_{15}, x_{16}\}$. The main parameters are n=16, k=m/2=3, $l=C_n^k=C_{16}^3=560$. We form the subset $Z^{560}=\{z_1, z_2, \ldots, z_{560}\}$, consisting of the elements $z_1=x_1+x_2+x_3$, $z_2=x_1+x_2+x_4$, $z_3=x_1+x_2+x_5$, ..., $z_{558}=x_{13}+x_{14}+x_{15}$, $z_{559}=x_{13}+x_{14}+x_{16}$, $z_{560}=x_{14}+x_{15}+x_{16}$. Each element is the sum of three elements with indices determined based on the combination generation function $C_{16}^3$ from the set $X^{16}$. Next, we find the subset $Y^{560}=\{y_1, y_2, \ldots, y_{560}\}$ based on the application of the mapping (21) to the subset $Z^{560}$. We check the condition $y_i=y_j$, which is satisfied for the indices i=2, j=560, namely, i=2, j=560, and exactly $y_2=(S-z_2)z_2=(137-42)42=95*42$, $y_{560}=(S-z_{560})z_{560}=(137-95)95=42*95$. We form the subset $X_6=X_3^i \cup X_3^j$ on the basis of the subsets $X_3^i$, $X_3^j$, which correspond to the elements $z_2$, $z_{560}$ which are used to form $X_6$. The indices of these subsets are i=2, j=560. Thus, we have $X_6=\{x_1, x_2, x_4, x_{14}, x_{15}, x_{16}\}$, S=137.

NUMERICAL EXAMPLE 4

Let the set $X^{16}=\{13,2,9,3,28,1,14,20,6,10,4,26,7,47,43, 5\}$ from the numerical example 1 be given. It is required to find a subset of $X_4$ with certificate S=110.

We solve this problem based on Lemma 6. We divide the original set $X^{16}$ into two subsets $X^7=\{17,2,9,3,28,1,14\}$ and $X^9=\{20,6,10,4,26,7,47,43,5\}$. To the subset $X^7$ we apply Lemma 1. We rewrite the original set in the form $X^7=\{x_1, x_2, x_3, \ldots, x_7\}$. The main parameters are n=7, $$k = k_1 = k_2 = \frac{m}{2} = 2,$$

$l=C_n^k=C_7^2=21$. We find the subset $Z^{21}=\{z_1, z_2, \ldots, z_{21}\}$, consisting of the elements $z_1=x_1+x_2$, $z_2=x_1+x_3$, $z_3=x_1+x_4$, ..., $z_{19}=x_5+x_6$, $z_{20}=x_5+x_7$, $z_{21}=x_6+x_7$. Each element is the sum of two elements with indices determined based on the Operation for generating the combination $C_7^2$, from the set $X^7$. Next, we find the subset $Y^{21}=\{y_1, y_2, \ldots, y_{21}\}$ based on the application of the mapping (21) to the subset $Z^{21}$.

We apply the same operations to the subset $X^9$. Here $C_9^2=36$. We find the subset $Z^{36}=\{z_1, z_2, \ldots, z_{36}\}$, consisting of the elements $z_1=x_1+x_2$, $z_2=x_1+x_3$, $z_3=x_1+x_4$, ..., $z_{34}=x_7+x_8$, $z_{35}=x_7+x_9$, $z_{36}=x_8+x_9$. Each element is the sum of two elements with indices determined based on the function for generating the combination $C_9^2$, from the set $X^9$. Next, we find the subset $Y^{36}=\{y_1, y_2, \ldots, y_{36}\}$ based on the application of the mapping (21) to the subset $Z^{36}$. We check the condition $y_i=y_j$, $y_i \in Y^{21}$, $y_j \in Y^{36}$, which holds for indices i=3, j=34. Here, the index i is taken from the indices of the elements of the first subset, and j from the indices of the elements of the second subset. Then $y_3=(S-z_3)z_3=(110-20)20=90*20$, $y_{34}=(S-z_{34})z_{34}=(110-90)90=20*90$. We form the subset $X_4=X_2^i \cup X_2^j$ on the basis of the subsets $X_2^i$, $X_2^j$, which correspond to the elements $z_3 \in Z^{21}$, $z_{34} \in Z^{36}$ which are used to form $X_4$. The indices of these subsets $X_2^i$, $X_2^j$ are i=3, j=34, respectively. Thus, we have $X_4=\{x_1, x_4, x_7, x_8\}$ for the certificate S=110.

The scope of application of the result in practice:
1. Information systems
2. Information retrieval systems
3. Big data
4. Logistical data routing
5. Logistical data transfer
6. Banking system operations
7. Payment system operations
8. Medical diagnostic systems
9. E-commerce
10. Transaction processing operations
11. Database management operations
12. Transport logistics
13. And others. The above list is not exhaustive.

The scope of the result in theory:
1. NP-complete problems
2. The search problem
3. The problem of feasibility (satisfiability problem)
4. Theory of algorithms
5. The problem of decision making (decision problem)
6. Travelling salesman problem
7. Knapsack problem
8. The encryption problem
9. The encipherment problem
10. Other problems.

TABLE 1

Comparative analysis of the formation of the target m-dimensional subset of the n-dimensional set.

| m-parameters | Proposed computational operations | | Table m-sum | | Exponential operations | |
|---|---|---|---|---|---|---|
| | Operations running time (T) | Required memory (M) | Operations running time (T) | Required memory (M) | Operations running time (T) | Required memory (M) |
| 4 | $T \simeq O(n^2)$ | $M \simeq O(n^2)$ | $T \simeq O(n^4)$ | $M \simeq O(n^4)$ | $T \simeq O(2^{n/2})$ | $M \simeq O(2^{n/4})$ |
| 5 | $T \simeq O(n^3)$ | $M \simeq O(n^3)$ | $T \simeq O(n^5)$ | $M \simeq O(n^5)$ | $T \simeq O(2^{n/2})$ | $M \simeq O(2^{n/4})$ |
| 6 | $T \simeq O(n^3)$ | $M \simeq O(n^3)$ | $T \simeq O(n^6)$ | $M \simeq O(n^6)$ | $T \simeq O(2^{n/2})$ | $M \simeq O(2^{n/4})$ |
| 7 | $T \simeq O(n^4)$ | $M \simeq O(n^4)$ | $T \simeq O(n^7)$ | $M \simeq O(n^7)$ | $T \simeq O(2^{n/2})$ | $M \simeq O(2^{n/4})$ |
| 8 | $T \simeq O(n^4)$ | $M \simeq O(n^4)$ | $T \simeq O(n^8)$ | $M \simeq O(n^8)$ | $T \simeq O(2^{n/2})$ | $M \simeq O(2^{n/4})$ |

The given table 1 provides effectiveness of the proposed operations comparing to existing ones in running time and required memory.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, or data may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. A method for reducing a computing operation time or computing resource usage associated with determining at least two data elements, associated with a target computing operation result, from a set of data elements, the method comprising:
   receiving or accessing, using one or more computing device processors, a first set of data elements,
      wherein the first set comprises two or more data elements, wherein a first data element of the two or more data elements is associated with a first index of the first set, and wherein a second data element of the two or more data elements is associated with a second index of the first set;
   receiving or accessing, using the one or more computing device processors, a target computing operation result,
      wherein the target computing operation result is based on at least one computing operation;
   determining or generating, using the one or more computing device processors, a second set of mapped data elements mapped via one or more indexes to the first set of data elements,
      wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and
      wherein each of the two or more mapped data elements is determined based on at least the target computing operation result;
   utilizing a physical or virtual memory for storing the second set;
   determining, using the one or more computing device processors, equivalence between at least two mapped data elements of the second set;
   determining, using the one or more computing device processors, index information associated with the at least two mapped data elements of the second set;
   determining, using the one or more computing device processors, and based on the index information associated with the at least two mapped data elements of the second set, related index information associated with at least two data elements of the first set;
   determining, using the one or more computing device processors, and using the related index information associated with the at least two data elements of the first set, the at least two data elements of the first set,
      wherein the at least one computing operation involving the at least two data elements of the first set results in the target computing operation result; and
   deleting the second set from the physical or virtual memory, or overwriting, in the physical or virtual memory, the second set with data.

2. The method of claim 1, wherein the first mapped data element comprises a product of the first data element multiplied by a difference between the target computing operation result and the first data element, and wherein the second mapped data element comprises a product of the second data element multiplied by a difference between the target computing operation result and the second data element.

3. A method for reducing a computing operation time or computing resource usage associated with determining at least three data elements, associated with a target computing operation result, from a set of data elements, the method comprising:
   receiving or accessing, using one or more computing device processors, a first set of data elements,
      wherein the first set comprises three or more data elements, wherein a first data element of the three or more data elements is associated with a first index of the first set, and wherein a second data element of the three or more data elements is associated with a second index of the first set;
   receiving or accessing, using the one or more computing device processors, a target computing operation result, wherein the target computing operation result is based on at least one computing operation;
   receiving or accessing, using the one or more computing device processors, an arbitrary data element of the first set;
   performing an equivalence-determining computing operation comprising:
      executing, using the one or more computing device processors, an intermediate computing operation based on the target computing operation result and the arbitrary data element of the first set,
      wherein the intermediate computing operation comprises determining, using the one or more computing device processors, an intermediate computing operation result based on the arbitrary data element and the target computing operation result;
   determining or generating, using the one or more computing device processors, a second set of mapped data elements mapped via one or more indexes to the first set of data elements,
      wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and
      wherein each of the two or more mapped data elements is determined or generated based on at least the intermediate computing operation result, utilizing a physical or virtual memory for storing the second set;
   determining, using the one or more computing device processors, whether there is equivalence between at least two mapped data elements of the second set;
   in response to determining the equivalence between the at least two mapped data elements of the second set:
      determining, using the one or more computing device processors, index information associated with the at least two mapped data elements of the second set;
      determining, using the one or more computing device processors, and based on the index information associated with the at least two mapped data elements of the second set, related index information associated with at least two data elements of the first set;
      determining, using the one or more computing device processors, and using the related index information associated with the at least two data elements of the first set, the at least two data elements of the first set,
         wherein the at least one computing operation involving the arbitrary data element and the at least two data elements of the first set results in the target computing operation result; and deleting the second set from the physical or virtual memory, or overwriting, in the physical or virtual memory, the second set with data.

4. The method of claim 3, further comprising, in response to determining no equivalence between the at least two mapped data elements of the second set;
   receiving or accessing, using the one or more computing device processors, a second arbitrary data element of the first set; and
   performing a second equivalence-determining computing operation, based on the second arbitrary data element of the first set.

5. The method of claim 3, wherein the first mapped data element comprises a product of the first data element multiplied by a difference between the intermediate computing operation result and the first data element, and wherein the second mapped data element comprises a product of the second data element multiplied by a difference between the intermediate computing operation result and the second data element.

6. A method for reducing a computing operation time or computing resource usage associated with determining at least four data elements, associated with a target computing operation result, from a set of data elements, the method comprising:
   receiving or accessing, using one or more computing device processors, a first set of data elements;
   receiving or accessing, using the one or more computing device processors, a target computing operation result, wherein the target computing operation result is based on at least one computing operation;
   determining or generating, using the one or more computing device processors, an intermediate set of data elements, wherein a first data element of the intermediate set is based on a combination computing operation involving at least two data elements of the first set associated with at least two different indexes of the first set;
   utilizing a physical or virtual memory for storing the intermediate set;
   determining or generating, using the one or more computing device processors, a second set of mapped data elements mapped via one or more indexes to the intermediate set of data elements,
      wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and
      wherein each of the two or more mapped data elements is determined based on at least the target computing operation result and based on at least one data element of the intermediate set;
   utilizing the physical or virtual memory for storing the second set;
   determining, using the one or more computing device processors, equivalence between at least two mapped data elements of the second set;
   determining, using the one or more computing device processors, index information associated with the at least two mapped data elements of the second set;
   determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, a first data element at a first index of the first set and a second data element at a second index of the first set, and a third data element at a third index of the first set and a fourth data element at a fourth index of the first set, wherein the first index, the second index, the third index, and the fourth index are different from each other, wherein the first data element of the first set and the second data element of the first set were or are used to determine or generate, using the combination computing operation, a first data element of the at least two data elements of the intermediate set, wherein the third data element of the first set and the fourth data element of the first set were or are used to determine or generate, using the combination computing operation, a second data element of the at least two data elements of the intermediate set, and wherein the at least one computing operation involving the first data element of the first set, the second data element of the first set, the third data element of the first set, and the fourth data element of the first set results in the target computing operation result; and deleting the second set or the intermediate set from the physical or virtual memory, or overwriting, in the physical or virtual memory, the second set or the intermediate set with data.

7. The method of claim 6, wherein the two data elements of the first set located at two different indexes of the first set are not used in combination to determine any other data element of the intermediate set.

8. A method for reducing a computing operation time or computing resource usage associated with determining at least five data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, an arbitrary data element of the first set;

performing an equivalence-determining computing operation comprising:

executing, using the one or more computing device processors, an intermediate computing operation based on the target computing operation result and the arbitrary data element of the first set, wherein the intermediate computing operation comprises determining, using the one or more computing device processors, an intermediate computing operation result based on the arbitrary data element and the target computing operation result;

determining or generating, using the one or more computing device processors, an intermediate set of data elements, wherein a first data element of the intermediate set is based on a combination computing operation involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and wherein each of the two or more mapped data elements is determined based on at least the intermediate computing operation result and based on at least one data element of the intermediate set;

utilizing the physical or virtual memory for storing the second set;

determining, using the one or more computing device processors, whether there is equivalence between at least two mapped data elements of the second set;

in response to determining the equivalence between the at least two mapped data elements of the second set:

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, a first data element at a first index of the first set and a second data element at a second index of the first set, and a third data element at a third index of the first set and a fourth data element at a fourth index of the first set, wherein the first index, the second index, the third index, and the fourth index are different from each other, wherein the first data element of the first set and the second data element of the first set were or are used to determine or generate, using the combination computing operation, a first data element of the at least two data elements of the intermediate set, wherein the third data element of the first set and the fourth data element of the first set were or are used to determine or generate, using the combination computing operation, a second data element of the at least two data elements of the intermediate set, and wherein the at least one computing operation involving the first data element of the first set, the second data element of the first set, the third data element of the first set, the fourth data element of the first set, and the arbitrary data element, results in the target computing operation result; and deleting the second set or the intermediate set from the physical or virtual memory, or overwriting, in the physical or virtual memory, the second set or the intermediate set with data.

9. The method of claim 8, further comprising, in response to determining no equivalence between the at least two mapped data elements of the second set;

receiving or accessing, using the one or more computing device processors, a second arbitrary data element of the first set; and performing a second equivalence-determining computing operation, based on the second arbitrary data element of the first set.

10. A method for reducing a computing operation time or computing resource usage associated with determining target data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, a target number of data elements associated with the target computing operation result;

determining or generating, using the one or more computing device processors, an intermediate set of data elements, wherein a first data element of the intermediate set is based on a combination computing operation, based on the target number of data elements, and involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and wherein each of the two or more mapped data elements is determined based on at least the target computing operation result and based on at least one data element of the intermediate set, utilizing the physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, target data elements of the first set, wherein each index of each target data element of the target data elements is different, wherein the at least one computing operation involving the target data elements of the first set results in the target compomputing operation result; and deleting the second set or the intermediate set from the physical or virtual memory, or overwriting, in the physical or virtual memory, the second set or the intermediate set with data.

11. A method for reducing a computing operation time or computing resource usage associated with determining target data elements, associated with a target computing operation result, from a set of data elements, the method comprising:

receiving or accessing, using one or more computing device processors, a first set of data elements;

receiving or accessing, using the one or more computing device processors, a target computing operation result, wherein the target computing operation result is based on at least one computing operation;

receiving or accessing, using the one or more computing device processors, a target number of data elements associated with the target computing operation result;

receiving or accessing, using the one or more computing device processors, an arbitrary data element of the first set;

performing an equivalence-determining computing operation comprising:

executing, using the one or more computing device processors, an intermediate computing operation based on the target computing operation result and the arbitrary data element of the first set, wherein the intermediate computing operation comprises determining, using the one or more computing device processors, an intermediate computing operation result based on the arbitrary data element and the target computing operation result;

determining or generating, using the one or more computing device processors, an intermediate set of data elements, wherein a first data element of the intermediate set is based on a combination computing operation, based on the target number of data elements, and involving at least two data elements of the first set associated with at least two different indexes of the first set;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and wherein each of the two or more mapped data elements is determined based on at least the intermediate computing operation result and based on at least one data element of the intermediate set;

utilizing the physical or virtual memory for storing the second set;

determining, using the one or more computing device processors, whether there is equivalence between at least two mapped data elements of the second set;

in response to determining the equivalence between the at least two mapped data elements of the second set:

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, the target data elements of the first set, wherein each index of each target data element of the target data elements is different, wherein the at least one computing operation involving the target data elements of the first set and the arbitrary data element results in the target computing operation result; and deleting the second set or the intermediate set from the physical or virtual memory, or overwriting, in the physical or virtual memory, the second set or the intermediate set with data.

12. The method of claim 11, further comprising, in response to determining no equivalence between the at least two mapped data elements of the second set;

receiving or accessing, using the one or more computing device processors, a second arbitrary data element of the first set; and performing a second equivalence-determining computing operation, based on the second arbitrary data element of the first set.

13. A method for reducing a computing operation time or computing resource usage associated with determining target data elements, associated with a target computing operation result, from a set of data elements, the method comprising:

receiving or accessing, using one or more computing device processors, a first set of data elements;

partitioning the first set into two or more subsets of data elements, wherein a first data element present in a first subset of the two or more subsets is not present in a second subset of the two or more subsets;

receiving or accessing, using the one or more computing device processors, a target computing operation result, wherein the target computing operation result is based on at least one computing operation;

receiving or accessing, using the one or more computing device processors, a target number of data elements associated with the target computing operation result;

splitting the target number of data elements associated with the target computing operation result into two or more mini-target numbers of data elements;

performing at least one equivalence-determining computing operation using at least one mini-target number of data elements of the two or more mini-target numbers of data elements and using at least one subset, or a combination of two or more subsets, of the two or more subsets of data elements, wherein a first equivalence-determining computing operation of the at least one equivalence-determining computing operation comprises:

determining or generating, using the one or more computing device processors, an intermediate set of data elements, wherein a first data element of the intermediate set is based on a combination computing operation based on a first mini-target number of data elements, and involving at least two data elements of the first set associated with at least two different indexes of the at least one subset or the combination of two or more subsets;

utilizing a physical or virtual memory for storing the intermediate set;

determining or generating, using the one or more computing device processors, a second set of mapped data elements mapped via one or more indexes to the intermediate set of data elements, wherein the second set of mapped data elements comprises two or more mapped data elements, wherein a first mapped data element of the two or more mapped data elements is associated with a first index of the second set, and a second mapped data element of the two or more mapped data elements is associated with a second index of the second set, and wherein each of the two or more mapped data elements is determined based on at least the target computing operation result and based on at least one data element of the intermediate set;

utilizing the physical or virtual memory for storing the second set;

determining, using the one or more computing device processors, equivalence between at least two mapped data elements of the second set;

determining, using the one or more computing device processors, index information associated with the at least two mapped data elements of the second set;

determining, using the one or more computing device processors, and based on the index information associated with the at least two mapped data elements of the second set, related index information associated with at least two data elements of the intermediate set;

determining, using the one or more computing device processors, and using the related index information associated with the at least two data elements of the intermediate set, target data elements of the at least one subset or the combination of two or more subsets, wherein each target data element of the at least one subset or the combination of two or more subsets is associated with a different index of the first set; and deleting the second set or the intermediate set from the physical or virtual memory, or overwriting, in the physical or virtual memory, the second set or the intermediate set with data, wherein the at least one computing operation involving the target data elements of the at least one subset, or the combination of two or more subsets, resulting from the first equivalence-determining computing operation, results in the target computing operation result.

* * * * *